United States Patent [19]
Rebiai et al.

[11] Patent Number: 5,796,407
[45] Date of Patent: Aug. 18, 1998

[54] PROCEDURE FOR GENERATION OF TEXTURE VIDEO IMAGES AND SPECIAL VIDEO EFFECTS AND DEVICE FOR IMPLEMENTATION OF THE PROCEDURE

[75] Inventors: Mohammed Rebiai, Cormielles-en-Parisis; Hugues Pavie, Beaufort-en-Vallee, both of France

[73] Assignee: Thomson Broadcast, Cergy-Pontoise Cedex, France

[21] Appl. No.: 383,316

[22] Filed: Feb. 3, 1995

[30] Foreign Application Priority Data

Feb. 4, 1994 [FR] France ................... 94 01269

[51] Int. Cl.$^6$ ................... G06T 11/00
[52] U.S. Cl. ................... 345/430
[58] Field of Search ................... 395/130, 118, 395/125, 128, 129, 131, 132, 133, 139, 141, 161, 155; 345/430

[56] References Cited

U.S. PATENT DOCUMENTS 4,694,407 9/1987 Ogden ................... 395/141
5,416,848 5/1995 Young ................... 395/141 X

FOREIGN PATENT DOCUMENTS 0 321 291 6/1989 European Pat. Off. .
0 473 152 3/1992 European Pat. Off. .
2176678 12/1986 United Kingdom .
WO 91/19280 12/1991 WIPO .

OTHER PUBLICATIONS

Second International Conference on Computer–Aided Design & Computer Graphics, Sep. 23–26, 1991. Eds: John Staudhammer and Qunsheng Peng. An Approach to the Synthesis of Realistic Terrain pp. 31–35.
EARSel Advances in Remote Sensing, vol. 1 No. 3–VII. P.A. Brivio and M. Righetti. Fractal Based Technique for Mountain Relief Reconstruction. pp. 136–141.
Terrain Modelling Using Fractal Interpolation Fuctions. Jelena Petric (Research Fellow) –Presented at Computer Graphics 88: Online Publications. pp. 95–105.

*Primary Examiner*—Almis R. Jankus
*Attorney, Agent, or Firm*—Oblon, Spivak, McClelland, Maier & Neustadt, P.C.

[57] ABSTRACT

The disclosure is a procedure for generation of textured images and special video effects. The procedure including a stage for generation of a microscopic texture determined by user-defined parameters and based on a fractal interpolation function generating a fractional Brownian motion-type signal. It also includes a stage for generation of motifs and for re-sampling. The invention is applicable to the generation of textured television images and special effects in standard television or HDTV.

15 Claims, 13 Drawing Sheets

N=4 SEGMENTS OF LENGTH r=1/3, WE HAVE A FRACTAL DIMENSION d=1.26...

PROCEDURE FOR GENERATION OF TEXTURE VIDEO IMAGES AND SPECIAL VIDEO EFFECTS AND DEVICE FOR IMPLEMENTATION OF THE PROCEDURE

BACKGROUND OF THE INVENTION

The present invention concerns a procedure for generation of textured video images, more particularly a procedure to generate textures in real time video for the purpose of including special effects in video images sequences.

The invention also concerns a device for implementation of said procedure.

Special effects and notably computer-generated images are well known in the cinema. In television, special effects are generally limited to incrustations, deformations of images or sophisticated image chaining. However in this domain, it is sometimes required to create a number of computer-generated images (or sequences), notably textured images. At present professional video equipment can produce textured images only in the form of crude, repeated motifs, used only to create background images on which other images are superimposed.

SUMMARY OF THE INVENTION

The present invention proposes a new procedure for generation of textured video images providing a very wide choice of textures which can be incrusted in a video image or used as a mixing key in a string of images with a view to generating sequences for artistic or publicity applications, for example The invention also proposes a new procedure for generation of textured video images that enables generation of textures, such as textiles, marble and atmospheric effects (clouds, fog), for decoration of stages or studios, using a single texture-generation procedure.

The generation procedure for tectured video images proposed is completely parameter-controlled, enabling simple modification of the appearance or enlargement of the textures in order to generate animated sequences.

Finally, the main purpose of the invention is to propose a new procedure for generation of textured video images that can generate a texture in real time, i.e. at frequencies of 25 images/s, 30 images/s, etc.

Consequently, the object of the invention is a procedure for generation of textured video images, including a stage for generation of a microscopic texture determined by user-defined parameters and based on a fractal interpolation function generating a fBm-type ("fractional Brownian motion") signal.

In a preferred embodiment, the fractal function is defined by:

$$F(x, y) = \sum_{k=0}^{N} r^{-kH} Spln(r^k x, r^k y)$$

where r is the lacunarity or irregularity factor (r>1);
H=(3−D), where D is the required fractal dimension;
N is a parameter fixed so as to obtain a definition to within one pixel or image element;
Spln(x,y) is the B-spline interpolation at a real point (x,y) in a grid of points generated with integer coordinates.

The present invention also proposes a procedure, which also includes a motif-generation stage receiving at its input the image of the fractal function and user-defined parameters input via a user interface (computer or special terminal) and which generates a macroscopic texture.

This stage is particularly useful for generating textures such as textiles or marble for example. It provides at its output the image of a "flat" texture, i.e. not "mapped" onto a surface. At the output of this stage, we can obtain either the design of the macroscopic motif of the texture, or duplicate the macroscopic motif of the texture. It is also possible to introduce the fractal function as phase noise on the motif or introduce the fractal function as additive noise on the image. This stage also enables, for example, an interweaving of two thread motifs and the generation of colors.

In a preferred embodiment, this stage is based on the functions:

$$M_1(x,y)=Spln_1(r_x x+dp_x F(x,y), r_y y+dp_y F(x,y))$$

$$M_2(x,y)=Spln_2(r_x x+dp_x F(x,y), r_y y+dp_y F(x,y))$$

where $r_x$ and $r_y$ are duplication coefficients of the motifs in x and y respectively;

$dp_x$ and $dp_y$ are de-phasing coefficients of the motifs in x and y respectively;

F(x,y) is the value of the fractal function at point (x,y).

$M_1(x,y)$ is the value at point (x,y) of the motif $P_1$ duplicated $r_x$ times in x, $r_y$ times in y and de-phased by $dp_x F(x,y)$ in x and by $dp_y F(x,y)$ in y and $M_2(x,y)$ is the value at point (x,y) of the motif $P_2$ duplicated $r_x$ times in x, $r_y$ times in y and de-phased by $dp_x F(x,y)$ in x and $dp_y F(x,y)$ in y.

Yet another characteristic of the present invention is that the procedure also includes a re-sampling stage enabling a "mapping" of the textured image onto a surface.

In a preferred embodiment, the re-sampling is made using the "output-to-input" method.

Yet another characteristic of the present invention is that a depth effect is added to the image by attenuating the luminosity of the point of the surface as a function of its distance relative to the display point.

Another purpose of the invention is a device for implementation of the process, as described above, which includes a specific circuit specific for calculation of the function Spln( ).

In a particular embodiment, the circuit for calculation of the Spln( ) function enables the following first matricial calculation to be performed:

$$\begin{bmatrix} P00 & P01 & P02 & P03 \\ P10 & P11 & P12 & P13 \end{bmatrix} \times \begin{bmatrix} X_0 \\ X_1 \\ X_2 \\ X_3 \end{bmatrix} = \begin{bmatrix} R_0 \\ R_1 \end{bmatrix}$$

followed by a second calculation, the multiplication of $$\begin{bmatrix} R_0 \\ R_1 \end{bmatrix} \text{ by } [Y_0 \; Y_1]$$

BRIEF DESCRIPTION OF THE DRAWINGS

The invention will be better understood from the following more detailed description of a preferred embodiment, making reference to the appended figures, of which.

The procedure for generation of textured video images, according to the present invention, includes a first stage for generation of a microscopic texture from user-defined parameters. In effect, the image of a scene involves two types of information: the contours delimiting the zones of the image and the nature of the surface contained in each zone. This latter type of information is called texture and describes the relations linking the various parts of the image. Moreover, textures are commonly separated into two classes: macroscopic textures and microscopic textures. Macroscopic textures are defined by local primitives or basic motifs that are organized spatially according to known rules whereas the microscopic textures are defined by a stochastic structure that governs the location and color of the pixels according to probability laws.

There are numerous algorithms used to generate microscopic textures. However, in general these algorithms known to professionals of the art enable only certain types of texture to be generated. For example, textures presenting strong orientations or regularities such as stripes, or textures simulating paper or textiles can be modelled by Markov fields. The drawback of this method is its complexity due to its iterative structure. Certain other textures simulating, for example, sand or grass can be obtained using auto-regressive models. These methods have the disadvantage of not always being stable.

Figure 1A:
FIGS. 1A to 1C are diagrams explaining fractal methods.
Figure 1C:
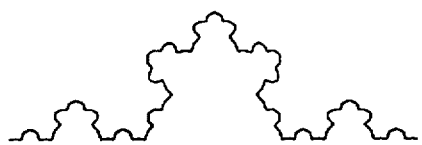
Figure 1B:

To generate textures of natural objects such as clouds or fog, fractal methods have been used. A fractal is a structure that displays the same motifs at all levels of scale, so that when the structure is enlarged, we find the same motif as at smaller scales. A fractal is characterised by its fractal dimension that can be compared with the topologic dimension. Thus a straight line has a topologic dimension of 1 and a plane a topologic dimension of 2. In comparison, a one-parameter fractal structure will have a fractal dimension between 1 and 2 depending on what extent it fills the plane. This is shown, for example, in FIG. 1 which shows a construction of a fractal structure: if we cut the segment 1 into three segments of length ⅓ and we replace the segment in the middle by two other segments of length ⅓, we obtain the structure 2. If we now repeat this process, for each new segment and at all levels of scale, we obtain the structure 3. Owing to its construction, this structure displays similitudes at all the levels of scale and has a dimension of 1.2.

The procedure for generation of textured video images, according to the invention, makes use of a specific fractal interpolation function that generates a microscopic texture in real time while respecting the quality of the image, notably an image of high definition. This fractal function must also be able to generate several basic types of textures such as natural textures like fog and clouds, textures like textiles, marble or similar and textures constituted from geometric motifs repeated at all levels of scale.

Consequently, the fractal interpolation function used is a Fbm (Fractional Brownian motion) function and is defined specifically by the following formula:

$$F(x, y) = \sum_{k=0}^{N} r^{-kH} Spln(r^k x, r^k y) \qquad (1)$$

where r is the lacunarity or irregularity factor (r>1);

H=(3−D), where D is the required fractal dimension;

N is a parameter fixed so as to obtain a definition to within one pixel or image element;

Spln(x,y) is the B-spline interpolation at a real point (x,y) in a grid of points generated with integer coordinates. The values of these grid points will be of random or deterministic type depending on the fractal sought.

Figure 2:
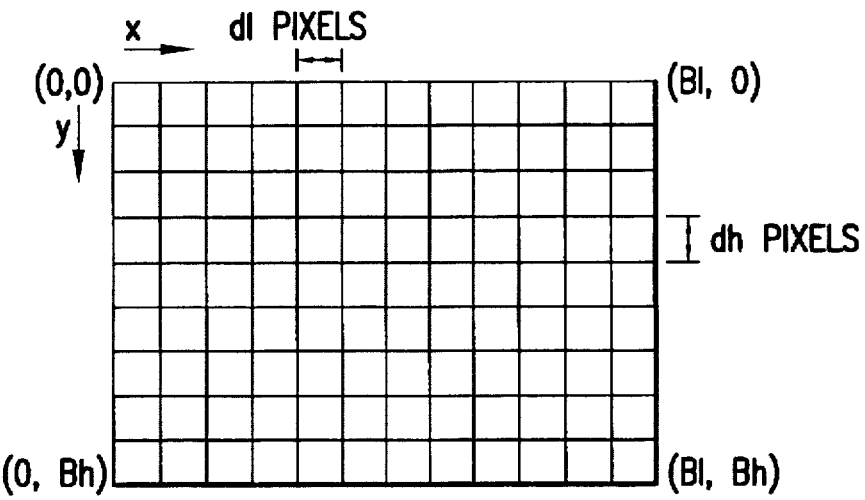
FIG. 2 shows a division of a screen, such as a television screen, for the implementation of a fractal function.

In the present invention, the function F( ) must be defined such that it can generate images of size W×L, W being the number of points per line, and L the number of active lines. In the framework of the present invention which involves generating video images, the image size could be 720×576 up to a high definition of 1920×1250. To obtain this type of definition, the screen is divided into Nbc=Bl×Bh blocks of size dl×dh pixels, where Bl and Bh indicate respectively the horizontal and vertical positions of the blocks, as shown in FIG. 2. In this case, the corners of the blocks form Npt= (Bl+1)×(Bh+1) points of integer coordinates from (0,0) to (Bl, Bh), as shown in FIG. 2. Thus, for a point $(x_i, y_i)$ of the screen, where $x_i$ belongs to the space [0, W−1] and $y_i$ belongs to [0, L−1], we calculate F(x,y) with:

$$x = Bl \cdot \frac{x_i}{W} = \frac{x_i}{dl} \quad \text{and} \quad y = Bh \cdot \frac{y_i}{L} = \frac{y_i}{dh} \qquad (2)$$

We can therefore define Spln( ) function, knowing the values at the Npt integer coordinates (0,0) to (Bl, Bh).

According to equation (1), we must calculate $Spln(r^k x, r^k y)$ with r>1 and k>0. Consequently, we move outside the domain of definition of Spln( ), which is [0, Bl]×[0, Bh]. To do this, we prolong this domain by making it periodic in x and y, and we then obtain:

Spln(Bl, i)=Spln(0, i) for all i∈[0, Bh]

Spln(j, Bl)=Spln(j, 0) for all j∈[0, Bl]

and:

Spln(x, y)=Spln(x+k*Bl, y+l*Bh)∀k and l∈N

To calculate $Spln(r^k x, r^k y)$, it is sufficient to map the values of the couple $(r^k x, r^k y)$ into the set [0, Bl]×[0, Bh].

Moreover, to obtain microscopic textures as uniform as possible, notably in the case of fog and clouds, the Spln( ) function chosen is a cubic function. In this case, we use an interpolation function on 16 points so as to avoid any discontinuities in the image. Thus the calculation of the value at a point $P_{xy}$ is defined by:

$$Spln(P_{xy}) = X^T M_B^T \begin{bmatrix} P00 & P10 & P20 & P30 \\ P01 & P11 & P21 & P31 \\ P02 & P12 & P22 & P32 \\ P03 & P13 & P23 & P33 \end{bmatrix} M_B Y \quad (3)$$

where $$X = \begin{bmatrix} 1 \\ x^1 \\ x^2 \\ x^3 \end{bmatrix} \text{ and } Y = \begin{bmatrix} 1 \\ y^1 \\ y^2 \\ y^3 \end{bmatrix}$$

and $M_B$ is the matrix enabling calculation of the coefficients of the bi-cubic polynomial.

Preferably, $M_B$ can be given by:

$$M_B = \frac{1}{6} \begin{bmatrix} 1 & -3 & 3 & -1 \\ 4 & 0 & -6 & 3 \\ 1 & 3 & 0 & 1 \\ 0 & 0 & 0 & 1 \end{bmatrix}$$

If we use the following notations:

$$P = \begin{bmatrix} P00 & P10 & P20 & P30 \\ P01 & P11 & P21 & P31 \\ P02 & P12 & P22 & P32 \\ P03 & P13 & P23 & P33 \end{bmatrix}$$

$$U = M_B X$$

and $$V = M_B Y$$

Then (3) becomes:

$$Spln(P_{xy}) = U^T P V$$

where $^T$ is the transposition operator.

By making a grid of Npt points on the screen, we obtain a set of Nbc matrices P, which can be stored in a table P[ ] of dimension Nbc.

In this case, the index I in the table P[ ] of the matrix to select for a point $(x_i, y_i)$ of the screen is calculated as follows:

$$I = (x_i \text{ div } dl) + Bl \times (y_i \text{ div } dh)$$

where "div" is the integer division operator.

Defined as above, the distance between $P_{11}$ and $P_{21}$ is dl pixels and that between $P_{11}$ and $P_{12}$ is dh pixels. The vector X can therefore take only dl values and the vector Y only dh values. It is then possible to pre-calculate the dl vectors U and also the dh vectors V such that the calculation of Spln( ) at a point requires only the pre-multiplication of the matrix P by the vector U and the multiplication of the result by the vector V.

Concerning the parameters N and r of the function (1), N+1 defines the number of calculations of Spln( ) that we can carry out in parallel and the lacunarity r determines the geometric progression in the frequency space. Now, in the highest frequencies, the samples of Spln( ) can not be of size less than Bl×Bh pixels, to avoid the spectral problems??OK??, since Spln( ) is a B-spline interpolation of a grid of Bl×Bh points. Moreover, N is directly linked to r.

From the relations (1) and (2), a sample of Spln( ) of width Bl is specified as follows:

$$r^N x = 1 \text{ for } x_i = 1$$

$$\rightarrow r^N \frac{1}{dl} = 1$$

which gives $N = \frac{\log dl}{\log r}$

Thus, the more reliable r is, the higher N will be. Now it is advantageous to have a low value for r in order to guarantee a slower progression in the frequency space, and to have a low value for N in order to have a minimum of operations to carry out in parallel.

In the framework of a generation of textured 4/3 video images, we can take N=5 and r=2.

Figure 3A:
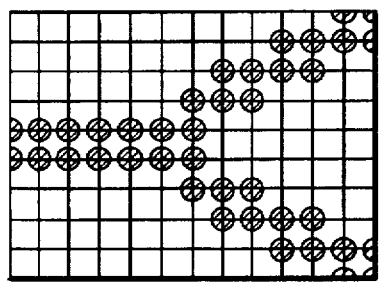
FIGS. 3A to 3C show schematically the motif-generation stage using two primitives, according to the present invention.
Figure 3B:
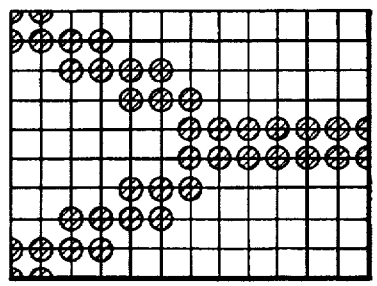
Figure 3C:
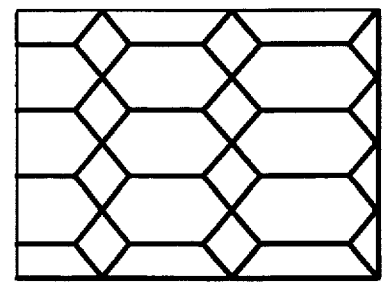

We shall now describe the motif-generation stage, with reference to FIG. 3. In this stage, the fractal function F( ) generated during the microscopic texture generation phase is received as input and we obtain at the output the image of a "flat" texture, i.e. an image non "mapped" onto a surface. This stage enables the macroscopic motif of the texture to be generated, by duplicating the microscopic motif of the texture and introducing the fractal function as phase noise on the motif and as additive noise on the image. This we can interweave two thread motifs, for example, and also manage the color.

As mentioned above, a texture can be considered at macroscopic and microscopic levels. To generate a macroscopic texture, a primitive is generally used. The stage above enables the combination of two primitives called $P_1$ and $P_2$, which could represent for example a reptile skin or the two threads of a textile. To obtain a macroscopic texture, these primitives can be duplicated in the image in x and in y. The microscopic structure of the texture and the variations of appearance of the primitives are obtained by introducing the fractal function F( ) from the previous stage in the form of noise correlated with the phasing of the primitives or noise correlated with the image. The two primitives $P_1$ and $P_2$ can have identical values in the case of utilization of a single primitive, or they can have neutral values if we wish the fractal aspect to be dominant.

In the procedure of the present invention, we use the spline function described above to calculate the primitives $P_1$ and $P_2$. As shown in FIG. 3, each primitive is characterised by Npt which we interpolate as a function of the duplications by the B-spline function. Thus, drawing A of FIG. 3 represents the Npt points defining $P_1$, drawing B the Npt points defining $P_2$ and drawing C the macroscopic structure obtained by duplicating the motifs $P_1$ and $P_2$. Generally speaking, we use the functions below to build a macroscopic texture.

Let $Spln_1( )$ be the Spln( ) function with the table of points $P_1$ and $Spln_2( )$ the Spln( ) function with the table of points $P_2$. We then define the functions $M_1$ and $M_2$:

$$M_1(x,y) = Spln_1(r_x x + dp_x F(x,y), r_y y + dp_y F(x,y))$$

$$M_2(x,y) = Spln_2(r_x x + dp_x F(x,y), r_y y + dp_y F(x,y))$$

where $r_x$ and $r_y$ are duplication coefficients of the motifs in x and y respectively;

$dp_x$ and $dp_y$ are de-phasing coefficients of the motifs in x and y respectively;

F(x,y) is the value of the fractal function at point (x,y).

$M_1$(x,y) is the value at point (x,y) of the motif $P_1$ duplicated $r_x$ times in x, $r_y$ in y, and de-phased by $dp_xF(x,y)$ in x and $dp_yF(x,y)$ in y. Similarly, $M_2$(x,y) is the value at point (x,y) of the motif $P_2$ duplicated $r_x$ times in x, $r_y$ in y, and de-phased by $dp_xF(x,y)$ in x and $dp_yF(x,y)$ in y.

From this motif-generation stage, we can perform a "mapping" of the microscopic or macroscopic texture obtained onto a surface. This mapping is achieved by including a re-sampling stage, the re-sampling preferably being carried out using a method known as "output-to-input". This method enables filtering defects to be avoided when we calculate the transformation between the pixels of two images. The method used in the present case to perform the mapping of a texture onto a plane surface, such as the round, a ceiling, a wall, etc., will be explained with reference to FIGS. 4A to 4C. In the present case, it has been chosen to carry out a perspective projection of the textured surface in the three-dimensional space (O,X,Y,Z) on the plane of the screen. For this reason, it is necessary to carry out the following operations:

position the flat textured surface in the space;
position the display screen in the space;
position the display point which will serve as the point of convergence in the space.

Figure 4A:
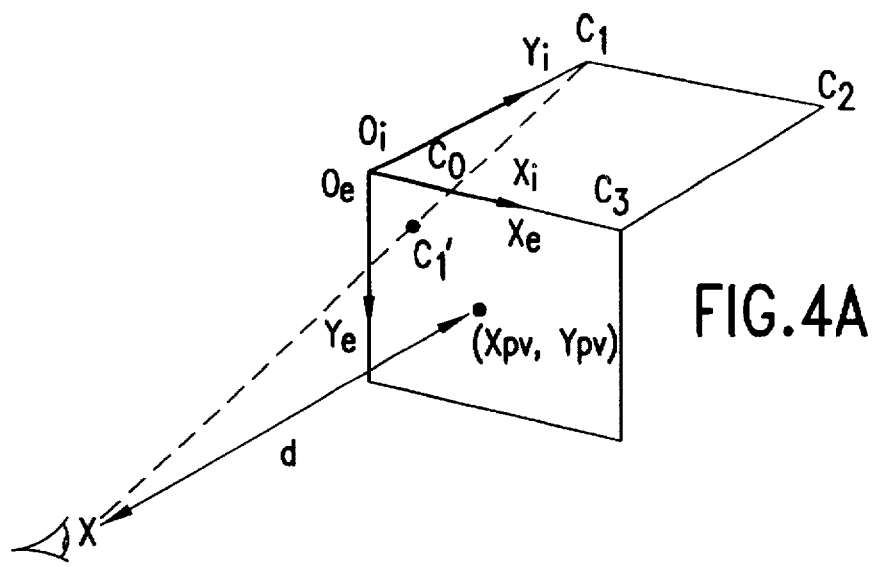
FIGS. 4A to 4C are drawings explaining the stage of "mapping" of a texture onto a surface, according to the present invention.
Figure 4B:
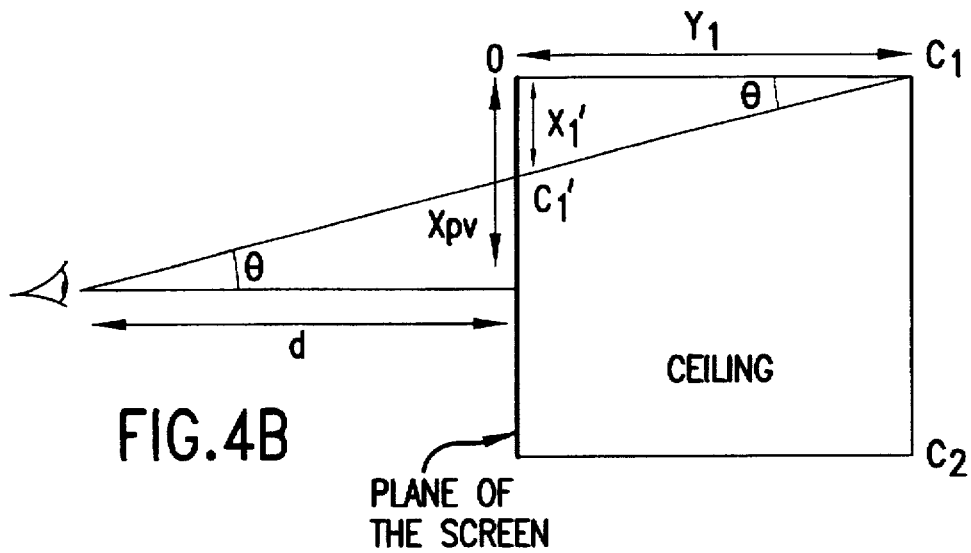
Figure 4C:
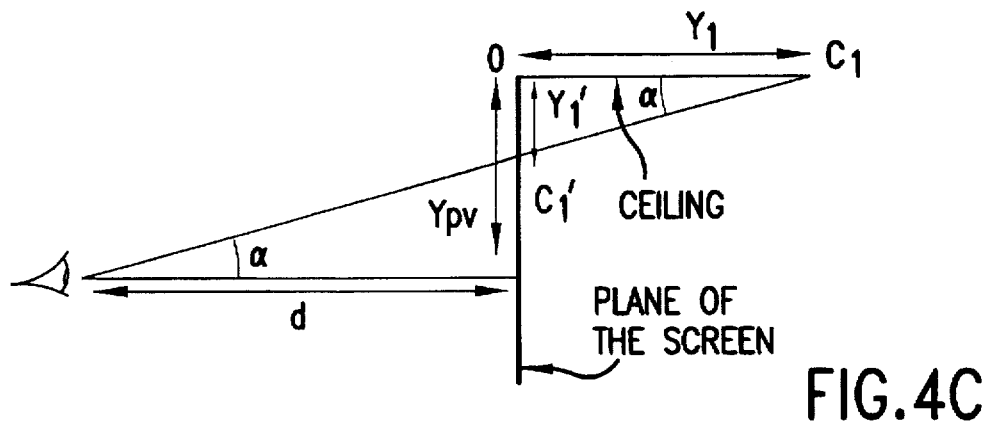

As an example and with reference to FIGS. 4A to 4C, we shall describe the calculations of the coordinates of the display point and the transformation for a mapping of a texture onto a ceiling. This technique of positioning of the objects of a perspective projection relative to the display point is derived from the method called "ray tracing", well known in the field of computer generation of images. Other planes could be obtained by similar calculations or by rotation relative to the centre of the screen plane.

As shown in FIG. 4A, we use the following notations:

$(0_i, X_i, Y_i)$ is the plane of the initial textured surface. This has the dimensions of an image and it comes from the motif-generation stage, i.e. the coordinates of the points $C_0, C_1, C_2$ and $C_3$ are respectively (0,0) (0,L−1), (W−1,L−1) and (W−1,0);

$(0_e, X_e, Y_e)$ is the plane of the screen;

$(X_{pv}, Y_{pv})$ is the projection normal to the plane $(0_e, X_e, Y_e)$ of the display point;

d is the distance between the display point and the point $(X_{pv}, Y_{pv})$;

$C_1'(X1', Y1')$ is the perspective projection of $C_1$(X1, Y1) on the screen plane relative to the display point and $C_0', C_1', C_2', C_3'$ are the respective projections of $C_0, C_1, C_2, C_3$.

The textured images and the screen are positioned such that the plane of the screen coincides with the front face of the volume symbolising the studio, for example. We then have:

$$C_0' = C_0$$

$$C_3' = C_3$$

$C_1'$ and $C_2'$ are symmetric relative to the axis cutting the screen vertically in the middle.

The point $(X_{pv}, Y_{pv})$ is located on the axis cutting the screen vertically in the middle, the observer being on the axis perpendicular to this axis.

We must then obtain $Y_{pv}$, d and the relation between the points projected on $(0_e, X_e, Y_e)$ and those in the plane $(0_i, X_i, Y_i)$.

From the plan view shown in FIG. 4B, we deduce the following relation:

$$\frac{X_{pv} - X'_1}{d} = \frac{X_1}{Y_1}$$

$$\rightarrow d = \frac{Y_1(X_{pv} - X'_1)}{X_1}$$

Similarly, from the side view shown in FIG. 4C, we deduce the following relation:

$$\frac{Y_{pv} - Y'_1}{d} = \frac{Y_1}{Y_1}$$

$$\rightarrow Y_{pv} = \frac{dY_1}{Y_1} + Y'_1$$

Moreover, for a point (X', Y') on the screen lying in the trapezoid $(C_0', C_1', C_2', C_3')$, we can calculate the coordinates of the source point (X,Y) on the textured plane as follows:

$$\frac{Y}{Y} = \frac{Y_{pv} - Y'}{d} \quad (4)$$

$$\frac{X_{pv} - X}{d + Y} = \frac{X_{pv} - X'}{d}$$

$$X = \frac{Y_{pv}(X' - X_{pv})}{Y_{pv} - Y'} + X_{pv}$$

$$Y = \frac{dY'}{Y_{pv} - Y'} \quad (5)$$

In addition to the execution of the mapping of the textured image onto a surface, it is also possible to add a depth effect. This is obtained by attenuating the luminosity of the point of the surface as a function of its distance from the display point. It is known that the intensity of diffuse reflection is given by:

$$I = I_i k_d \cos \tau$$

where $I_i$ is the incident luminous intensity;

$k_d$ is the reflection coefficient of the surface;

cos τ is equal to the scalar product of the incident ray vector I and n, the normal to the surface at point P.

Consequently, the intensity of the diffuse light decreases in inverse proportion the square of the distance $S_{pv}$ between the surface and the display point. This distance is expressed as follows:

$$dist_{SPV} = \sqrt{(d + Y)^2 + Y_{pv}^2 + (X_v - X)^2}$$

To make the depth effect more perceptible, it is preferable to make the attenuation of the luminosity predominate in the depth of the surface (in other words, the Y terms) rather than laterally. To do this, we can neglect the terms in X compared with the terms in Y. Expressing X as a function of Y, as defined in the equation above for $dist_{SPV}$, and making the simplification mentioned, we obtain the equation for the attenuation as a function of Y:

$$\text{attenuation}(Y) = \frac{C \cdot (Y_{pv} - Y)^2}{Y_{pv}^2 \cdot (d^2 + (Y_{pv} - Y)^2)}$$

where C is a normalisation constant.

A supplementary characteristic of the invention is that, using the elements obtained at the output of the re-sampling stage, we can apply relief to the clouds, the re-sampling stages giving an image of computer-generated image representing, for example, a cloud ceiling including the effect of absorption of light. At the re-sampling level, we take as input an image obtained at the output of the motif-generation stage which has the characteristics of a fractal surface. To each pixel of this image, we associate a thickness proportional to the value of the pixel. The fractal image from the motif-generation stage will be used to generate a volume whose surface will be fractal. This volume is then positioned in the space (0, X, Y, Z) such as the ceiling described above. In this case also, the technique of calculation is derived from "ray tracing" as described for the mapping of a textured image onto a surface. This stage is illustrated in FIGS. 5A and 5B.

Figure 5A:
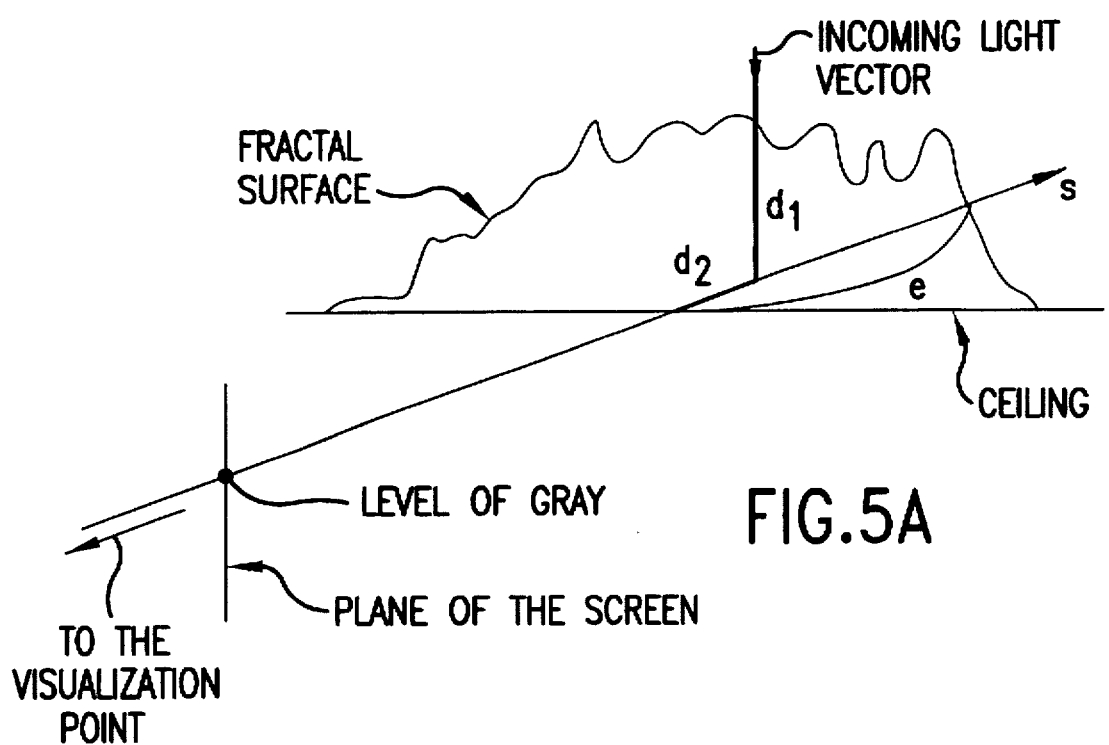
FIGS. 5A to 5B are drawings explaining how relief is added to the textures, such as clouds.
Figure 5B:
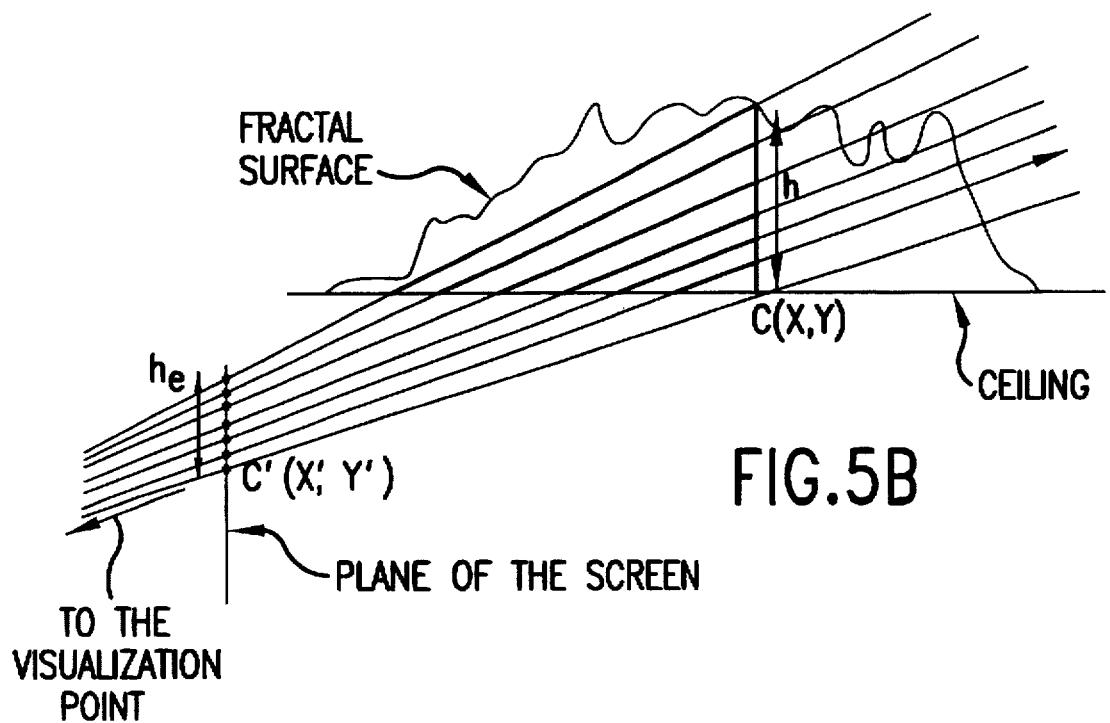

In FIG. 5A, the level of gray, denoted ng, is in fact proportional to the absorption of the light through the cloud and can be given by the equation below:

$$ng \text{ is proportional to } \int_0^{e_1} (\alpha.d_1(s) + \beta.d_2(s))ds$$

where $\alpha$ and $\beta$ are normalisation constants

One way of resolving the expression above consists in converting the integral into a summation by making the integral discrete, so that we evaluate the summation progressively as we scan the pixels, as shown in FIG. 5B. Then, starting with the points of the horizon line and working column by column towards the points at the top of the screen, for each pixel C' of the screen we calculate the coordinates of its source point C on the textured plane as described above. The value of the fractal image in C then gives the thickness of the cloud h. Next, we calculate the projection of the height h on the screen $h_e$ in order to know the number of pixels of the screen that will be effected by the absorption of the light penetrating at the vertical of C.

$$h_e = \frac{h.(Y_{pv} - Y')}{Y_{pv}}$$

If we consider the segment of the screen [(X', Y'), (X', Y'-$h_e$], then for each point C" (X", Y") (with Y"$\in$[Y', Y'-$h_e$]) of the segment we calculate the term:

$$\Delta ng = \exp(\alpha.d_1(Y', Y'', h) + \beta.d_2(Y', Y'', h))$$

The term obtained is then added to the value of the pixel C". As we move progressively up from the horizon line to the top of the screen, several terms $\Delta$ng are calculated in C" and applied to the pixel. In this way we obtain an approximation of the exponential function whose visual result is quite satisfactory.

However, the term $\Delta$ng calculated in C" remains complex since it makes uses of the function (exp) and the calculation of $\alpha.d_1+\beta.d_2$ given by the following expression:

$$\alpha.d_1(Y',Y'',h) + \beta.d_2(Y',Y'',h) = \beta h + \frac{Y_{pv}(Y'-Y'')}{Y_{pv}-Y'}\left[\alpha\sqrt{1 + \frac{d^2}{(Y_{pv}-Y'')^2}} - \beta\right]$$

In practice, in order to implement the function (exp), we can simplify the problem by creating a table (exp[ ]) whose size can be pre-defined. We have been able to limit this table at 1024 values without observing any adverse effects. In this case, $\alpha.d_1+\beta.d_2$ then becomes the index of the table exp[ ] with the normalizing coefficients $\alpha$ and $\beta$ providing a mapping of the values of $\alpha.d_1+\beta.d_2$ onto the integer range |0–1023|.

In addition to the operations above, which provide images whose luminance is coded with 10 or 12 bits, it is possible at the output of the motif-generation stage to use a supplementary bit of data per pixel to indicate whether the pixel takes the color of motif $P_1$ or that of motif $P_2$. In this case, for each pixel, a bit selects the LUT (Look-Up Table) of colors and the 10 remaining bits define the color.

We shall now describe the application of the various stages described above to the generation of a 720×576 or 4:2:2 TV image.

For a TV image of format 720×576, we have L=576 and W=720, which leads us to a choose:

Bl=12, Bh=9;

Dl=60, Dh=64;

Npt=130, Nbc=108.

As regards the values of r and of N, we preferably choose r=2 and N=5.

r=2 is the optimal value of r to perceive the effects of the Spln function.

In an electronic circuit, multiplications by $r^{2k}$ can be performed by bit shifting.

r=2_N=5. In this case, six calculations of Spln( ) are necessary to obtain F( ) for each pixel, which remains reasonable for a implementation in an integrated circuit.

For each parameter H, we can rapidly pre-calculate the six multiplying terms $r^{-kH}$ that we can store in a table called C[ ].

Based on the information above, we give below the various algorithms for the calculation of F( ), for the generation of the motif, then for the re-sampling of the motif with or without a relief affect in the TV format.

Algorithm for Calculation of F( ) (4:2:2 Image)

We suppose that the table P[ ] is initialized and U[ ], V[ ] and C[ ] have been calculated.

```
BEGIN
FOR yi FROM 0 to 575 DO
    FOR xi FROM 0 to 719 DO
        F=0
        FOR k FROM 0 to 5 DO
            x = xi * 2k
            y = yi * 2k
            index_u = x mod 60
            index_v = y mod 64
            index_p = [(y div 60) mod 12] + 12 * [(y div 64) mod 9]
            Spln = U[index_u] * P[index_p]| * V[index_v]
            F = F + C[k] * Spln
        END_DO
        Display F
    END_DO
END_DO
```

Note:
Mod is the modulo operator,
div is the integer division operator

Algorithm for Motif Generation (4:2:2 Image)

We suppose that the tables Y1[ ], Y2[ ], Y3[ ], attenuation[ ] and d3[ ], and also Xvp and d have been pre-calculated.

```
BEGIN
FOR yi FROM 0 to 575 DO
    FOR xi FROM 0 to 719 DO
        X = rx*xi + dpx*F(xi,yi)
        Y = ry*yi + dpy*F(xi,yi)
        M1 = Spln1(X,Y)
        M2 = Spln2(X,Y)
        IF ((M1 > threshold) and (M2 > threshold) THEN
            IF (Odd_duplicate. (X,Y)) THEN R = M1; COLOR = Color(1)
            ELSE R = M2; COLOR = Color(2)
            END_IF
        ELSE
            IF (M1 > M2) THEN R = M1; COLOR = Color(1)
            ELSE R = M2; COLOR = Color(2)
            END_IF
        END_IF
        R = R + a * F(xi,yi)
        Display R at pixel (xi,yi)
    END_DO
END_DO
END
```

Note:
a is the additive correlated noise coefficient.
Color() is a function defining the color: motif 1 or motif 2.
Odd_duplicate () is a test function for the interweaving of samples.

Algorithm for Re-sampling Calculation (4:2:2 Image)

We suppose that the tables Y1[ ], Y2[ ], and also Xvp and d have been pre-calculated.

We suppose that the tables Y1[ ], Y2[ ], Y3[ ], attenuation[ ] and $d_3$[ ], and also Xvp and d have been pre-calculated.

```
BEGIN
FOR Y' FROM 0 to 575 DO
    FOR X' FROM 0 to 719 DO
        IF(Y' < Y1') THEN
            Y = Y1[Y']
            X = Y2[Y'] * (X' - Xvp) + Xvp
            IF((X<720) AND X>0)) THEN
                Locate the pixel (X,Y) on the textured plane
                and display it on the screen at (X', Y')
            ELSE display_background (X',Y')   **(X',Y') is on the left or the right of the
                                                 trapezoid (C0', C1', C2', C3')
            END_IF
        ELSE display_background(X',Y')   **(X',Y') is below the trapezoid (C0', C1',
                                            C2', C3')
        END_IF
    END_DO
END_DO
END
```

Algorithm for Re-sampling Calculation (4:2:2 Image)

```
BEGIN
FOR X' FROM 0 to 719 DO
    FOR Y' FROM 575 to 0 DO
        IF (Y' < Y1') THEN
            Y = Y1[Y']
            X = Y2[Y'] * (X' - Xvp) + Xvp
            IF((X<720) AND X>0)) THEN
                h = pixel_value(textured_image,X,Y)
                IF (relief-required ) THEN
                    he = h * Y3[Y']
                    address(expo[]) = adress(exp[]) + bh
                    FOR Y" FROM Y' to Y'-he DO
                        Dng = expo[d3[Y',Y"]]              **Calculate Dng
                        ng = pixel_value(screen-plane, X',Y")
                        ng = ng + Dng                      **Make the integral discrete
                        display(screen-plane, X',Y",ng)
                    END_DO
                ELSE display(screen-plane, X',Y",h*attenuation[Y'])   **No relief
                END_IF
            ELSE display(screen-plane, X',Y',background_vlaue)   **(X',Y') is on the left or the right
```

|  | of the trapezoid (C0', C1', C2', C3') |
|---|---|
| END_IF | |
| ELSE display(screen-plane, X',Y',background_vlaue) | **(X',Y') is below the trapezoid (C0', C1', C2', C3') |
| END_DO | |
| END_DO | |
| END | |

Note:
display(buffer,X',Y',val) displays the value "val" at the pixel (X',Y') of the "buffer" plane.
pixel_value(buffer,X,Y) maps the value at point (X,Y) to the "buffer" plane We shall now describe, with particular reference to FIGS. 6 to 17, a mode of implementation of the device for applying the process described above in the case where r=2 and N=5.

In this case, the fractal function F(x.y) is such that:

$$F(x,y) = |r^0 Spln(x,y) + r^{-H}Spln(rx,ry)| + \qquad (6)$$
$$|r^{-2H}Spln(r^2x,r^2y) + r^{-3H}Spln(r^3x,r^3y)| +$$
$$|r^{-4H}Spln(r^4x,r^4y) + r^{-5H}Spln(r^5x,r^5y)|.$$

Thus, for the calculation of $Spln(r^k x, r^k y)$, it is sufficient of map the values of the couple $(r^k x, r^k y)$ into the set $[0,Bl] \times [0,Bh]$.

Figure 6:
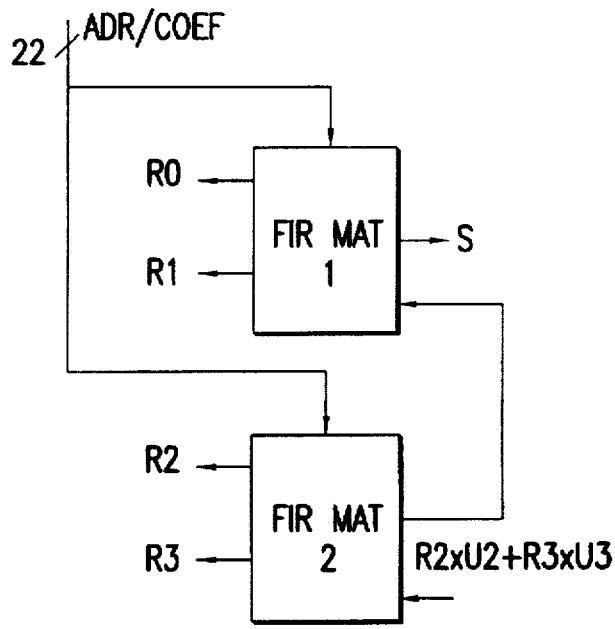
FIG. 6 is a diagram of the circuit calculating the Spln function.

FIG. 6 shows the association of specific circuits labelled "FirMat" which enable in particular the calculation of the function Spln( ). A first circuit performs a first matricial calculation, consisting in multiplying the matrix:

$[P_{00}\ P_{01}\ P_{02}\ P_{03}]$
$[P_{10}\ P_{11}\ P_{12}\ P_{13}]$ by the vector $[X_0]$
$[X_1]$
$[X_2]$
$[X_3]$ To do this, the coefficients $P_{00}\ P_{01}\ P_{02}\ P_{03}$ and $P_{10}\ P_{11}\ P_{12}\ P_{13}$ are stored in a RAM (Random Access Memory), whereas the values of the vectors $X_0\ X_1\ X_2\ X_3$ can be fed to the input of the circuit itself or possibly stored in a other RAM.

First, the value $X_0$ is multiplied by $P_0$ in a multiplier and the result is stored in a register $r_0$; $X_1$ is multiplied by $P_0$ and the result is stored in a register $r_1$; $X_2$ is multiplied by $P_{02}$ and the result is stored in a register $r_2$; $X_3$ is multiplied by $P_{03}$ and the result is stored in a register $r_3$. Similarly, $X_0$ is multiplied by $P_{10}$ and the result is stored in $r'_0$; $X_1$ is multiplied by $P_{11}$ and the result is stored in $r'_1$; $X_2$ is multiplied by $P_{12}$ and the result is stored in $r'_2$; $X_3$ is multiplied by $P_{13}$ and the result is stored in $r'_3$. Next, the values stored in $r_0$ and $r_1$ are added and the result is stored in $r''_1$; the values stored in $r_2$ and $r_3$ are added and the result is stored in $r''_0$. The two values from $r''_0$ and $r''_1$ are added and the result $R_0$ is stored. Similarly, the values stored in $r'_0$ and $r'_1$ are added and the result is stored in register $r''_3$; the values stored in $r'_2$ and $r'_3$ are added and the result is stored in $r''_2$. The values stored in $r''_2$ and $r''_3$ are then added to give the value $R_1$. The values $R_0$ and $R_1$ thus obtained are then multiplied. In this case $R_0$ is multiplied by the coefficient $Y_0$, the value obtained being stored in a register $s_0$; $R_1$ is multiplied by the coefficient $Y_1$, the value obtained being stored in a register $s_1$. Then the values stored in $s_0$ and $s_1$ are added to give the value S. To execute the function Spln( ) given in (3), we therefore use two circuits arranged as shown in FIG. 6. In this case, the circuit FirMat 1 outputs the values $R_0$, $R_1$ and S and receives as input the value $R_2 \times U_2 + R_3 \times U_3$ from the circuit FirMat 2. The circuit FirMat 2 also outputs the values $R_3$ and $R_2$. The two circuits FirMat 1 and FirMat 2 receive as input the addresses and coefficients $V_0, V_1, V_2, V_3$, notably from the user-processor. Thus, the two FirMat circuits cascaded as shown in FIG. 6 enable the matricial calculation to be performed by decomposing the equation (3) as follows:

$$S = |U_0 U_1| \times |P_{10}P_{11}P_{12}P_{13}| \times \begin{matrix}|V_0|\\|V_1|\\|V_2|\\|V_3|\end{matrix} + |U_2 U_3| \times \begin{matrix}|P_{20}P_{21}P_{22}P_{23}|\\|P_{30}P_{31}P_{32}P_{33}|\end{matrix} \times \begin{matrix}|V_0|\\|V_1|\\|V_2|\\|V_3|\end{matrix}$$

Figure 7:
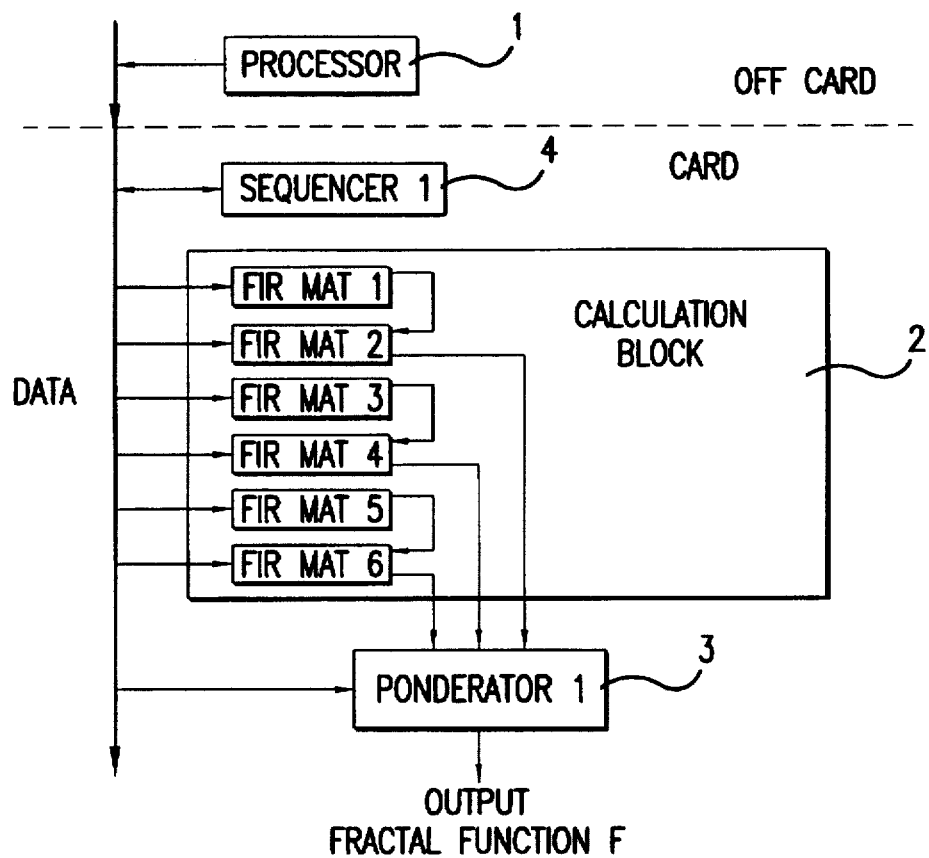
FIG. 7 is a block diagram of the stage generating the fractal function.

We shall now describe a circuit for generation of the fractal function, making reference to FIGS. 7 to 10. The fractal function is generated by a "hardware" component, labelled "card" in FIG. 7, and data from a processor 1 in the part labelled "off-card" in FIG. 7. In a simplified manner, the circuit generating the fractal function includes a calculation block 2 used to perform the function F(X,Y) given by equation 4. This calculation block is composed of six FirMat circuits as shown in FIG. 7.

In the generator shown in FIG. 7, for each pixel, each pair of FirMat circuits (FirMat 1 and FirMat 2; FirMat 3 and FirMat 4; FirMat 5 and FirMat 6) calculates two Spln( ) terms. The three outputs from these pairs, respectively from FirMat 2, FirMat 4 and FirMat 6, are fed to the input of a ponderator 3 that will be described in more detail below. Moreover, the "Hardware" part of the generator includes a sequencer 4 also described in more detail below. The data fed to the input of the sequencer, from the ponderator and the Spln( ) calculation block are notably obtained from a processor 1 and from external means as already described above. As shown in FIG. 7, at the output of the ponderator 3, we obtain the fractal function F.

Figure 8:
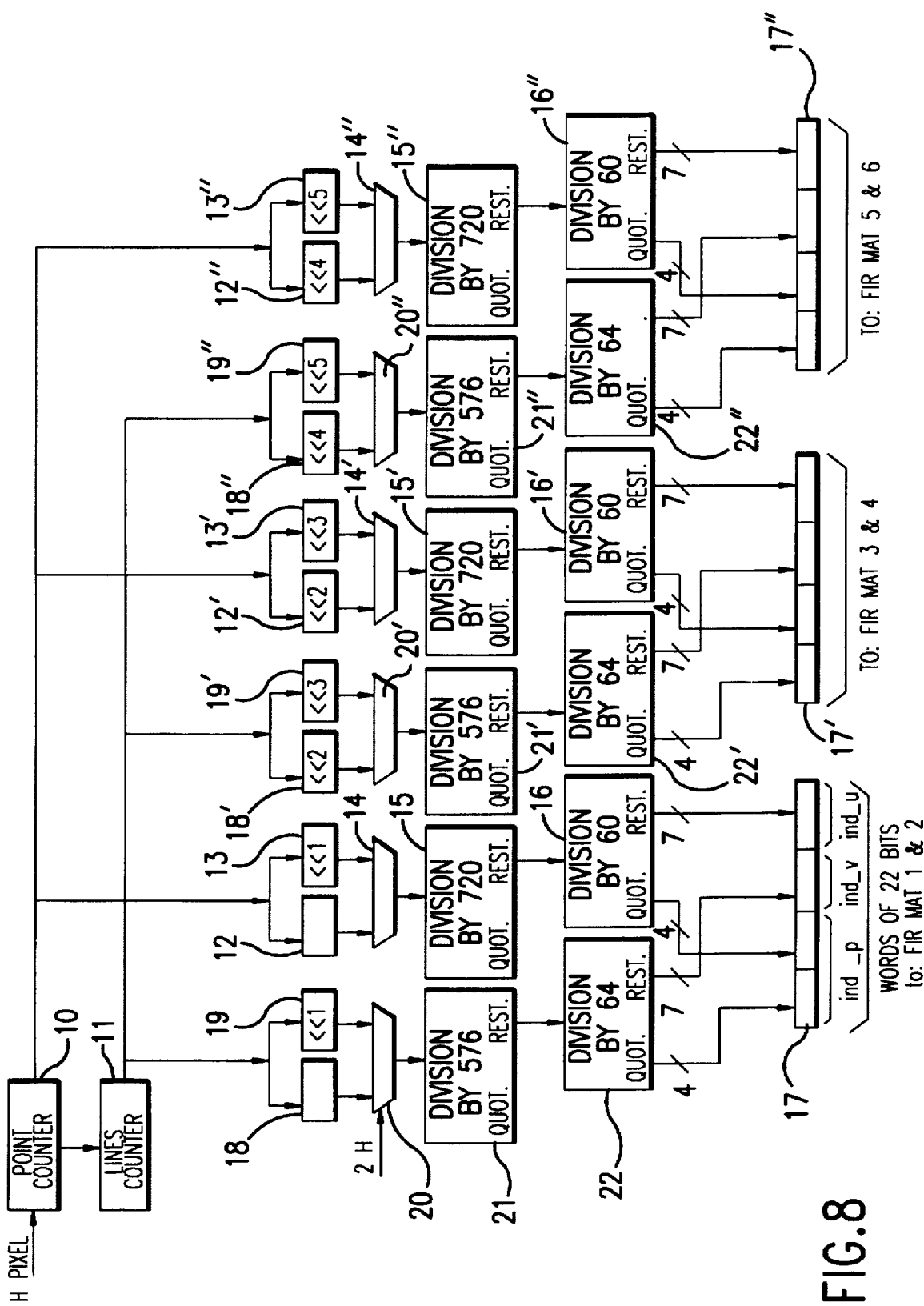
FIGS. 8 and 9 show the sequencer and ponderator?? circuits of FIG. 7.
Figure 9:
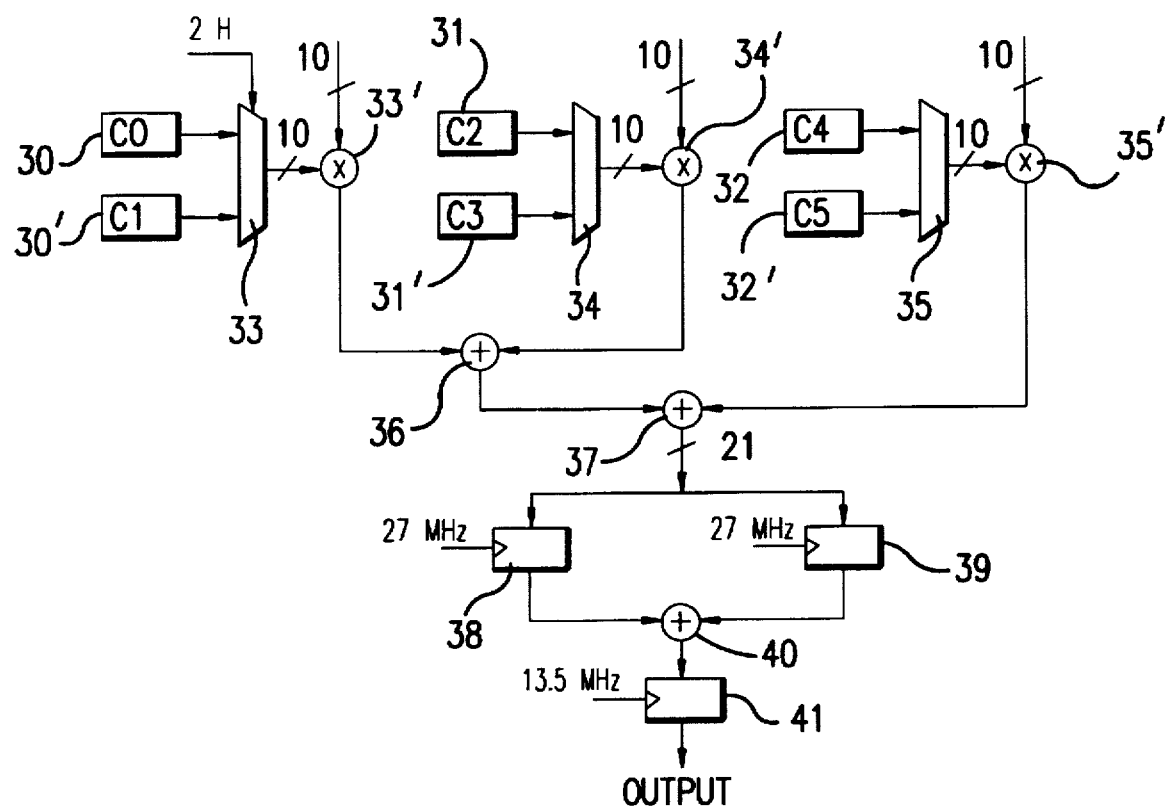

We shall now describe succinctly an embodiment of the sequencer 4, with reference to FIG. 8. The sequencer 4 feeds the parameters u, v and p, as a function of the pixel of the image, to each pair of FirMat circuits in the calculation block 2. The sequencer of FIG. 8 is adapted to the treatment of a TV image of format 720×576, as defined above, in which the value of the parameter r has been set to 2. Consequently, the multiplications by the $r^k$ are performed by left-shifting of bits. The sequencer of FIG. 8 therefore includes a point counter 10 counting at the clock frequency "H pixel" and a line counter 11. The output of the point counter 10 is fed to the inputs of three circuits of identical structure: each circuit is constituted by two shift registers in parallel 12 and 13, 12' and 13', 12" and 13". The register 12 receives the value from the point counter 10 whereas the register 13 receives this value left-shifted by one bit; the register 12' the value left-shifted by two bits; the register 13' the value left-shifted by three bits; the register 12" the value left-shifted by four bits; the register 13" the value left-shifted by five bits. The values stored in the registers 12 and 13 are fed to a multiplexer 14. Similarly, the values from the registers 12' and 13' are fed to a multiplexer 14' and the values from the registers 12" and 13" are fed to a multiplexer 14". The multiplexers operate at frequency 2H. The values from the multiplexers 14, 14' and 14" are fed to dividers 15, 15' and 15" that perform a division by 720; the remainder of this division is fed to dividers 16, 16' and 16" that perform a division by 60. The quotient of the division by 60 from the dividers 16, 16', 16" is fed to registers 17, 17', 17" to form part of the index p, whereas the remainders of the divisions performed by 16, 16', 16" are fed respectively to the registers 17, 17', 17" to form the index u. Once all the points of a line are counted, the point counter increments the line counter. The outputs of the line counter 11 are fed to three circuits of identical structure: the output is fed respectively to a three sets of two registers 18 and 19, 18' and 19', 18" and 19". These registers are shift registers functioning like the registers 12, 13, 12', 13', 12", 13". In a similar way, the outputs from the two shift registers 18 and 19 are fed to a multiplexer 20 operating at frequency 2H, the outputs of the shift registers 18', 19' are fed to a multiplexer 20', and the output of the registers 18", 19" are fed to the input of a multiplexer 20". The outputs of the multiplexers 20, 20' and 20" are fed respectively to dividers 21, 21', 21" which perform divisions by 576. The remainders of these divisions are fed to dividers 22, 22', 22" which perform divisions by 64. The quotient of the divisions performed by 22, 22', 22" are fed respectively to the registers 17, 17', 17" as part of the index p, whereas the remainders of the divisions performed by 22, 22' and 22" are fed respectively to the registers 17, 17' and 17" as index v. In fact, the terms u, v and p are concatenated into a 22-bit address to be used by the pairs of FirMat circuits in the calculation block 2 of FIG. 7.

We shall now describe, with particular reference to FIG. 8??2??, an embodiment of the ponderator 3 of FIG. 7. The ponderator includes registers 30, 30', 31, 31', 32, 32' respectively containing the coefficients $C_0$, $C_1$, $C_2$, $C_3$, $C_4$, $C_5$ that must be applied to the Spln( ) values from the calculation block 2. In a more specific manner, the registers 30 and 30' are connected to a multiplexer 33 operating at frequency 2H whose output is fed to a multiplier 33' which receives on its other input the Spln( ) term from the circuits FirMat 1 and FirMat 2. Similarly, the registers 31 and 31' are connected to a multiplexer 34 whose output is fed to a multiplier 34' which receives on its other input the Spln( ) term from the circuits FirMat 3 and FirMat 4. Registers 32 and 32' are connected to a multiplexer 35 whose output is fed to a multiplier 35' which receives on its other input the Spln( ) term from the circuits FirMat 5 and FirMat 6. The results from multipliers 33' and 34' are added in an adder 36 whose output is added to the output of the multiplier 35' in an adder 37. The results at the output of the adder 37 are stored in a first register 38 for a first series of three Spln( ) terms, whereas the result from the adder 37 is stored in a second register 39 for the second series of three Spln( ) terms. These registers 38 and 39 operate at a frequency of 27 MHz. The output of the registers 38 and 39 is fed to an adder 40 whose output is stored in a register 41 operating at a frequency of 13.5 MHz and giving at its output the required fractal function.

Figure 10:
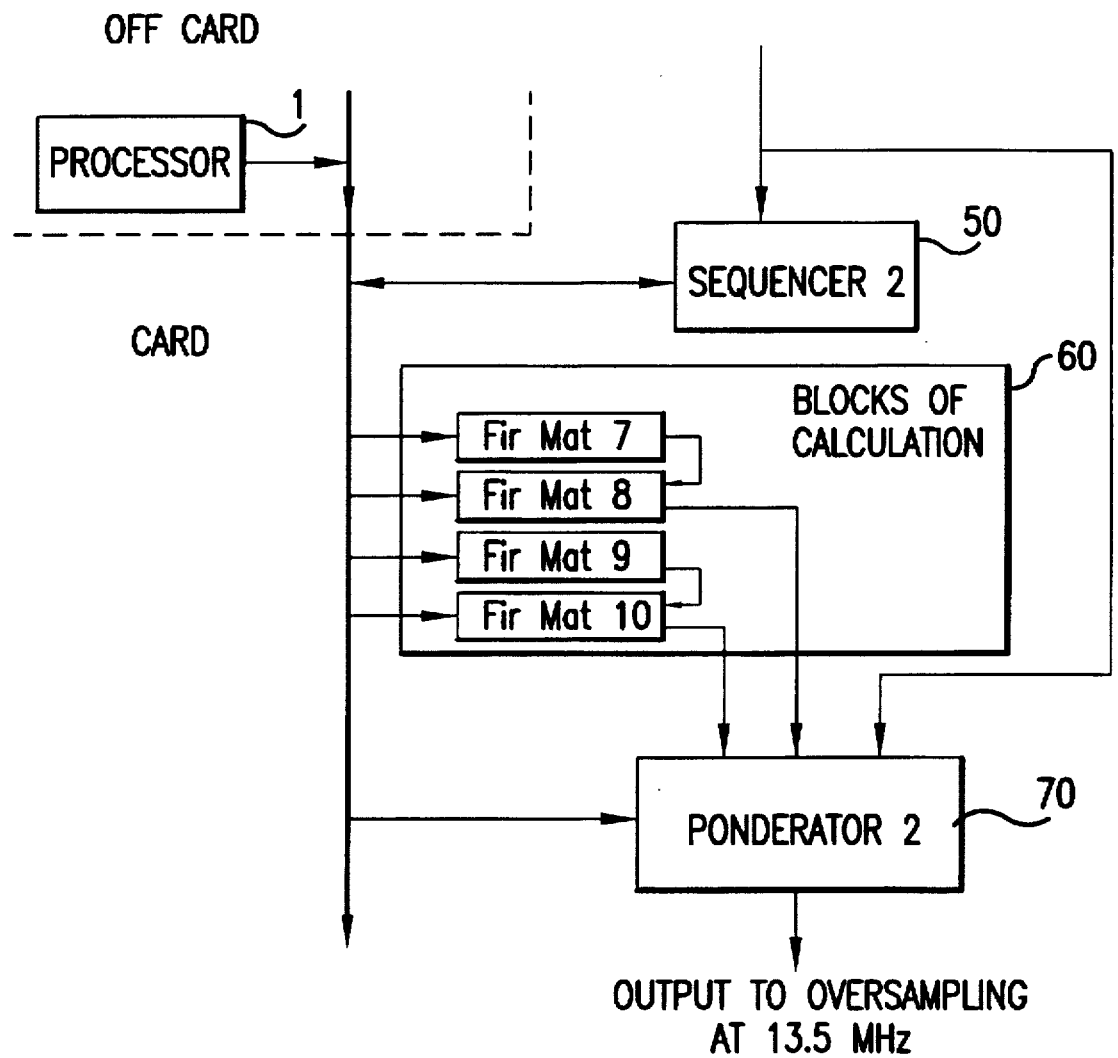
FIG. 10 is a block diagram of the motif-generation stage.
Figure 11:
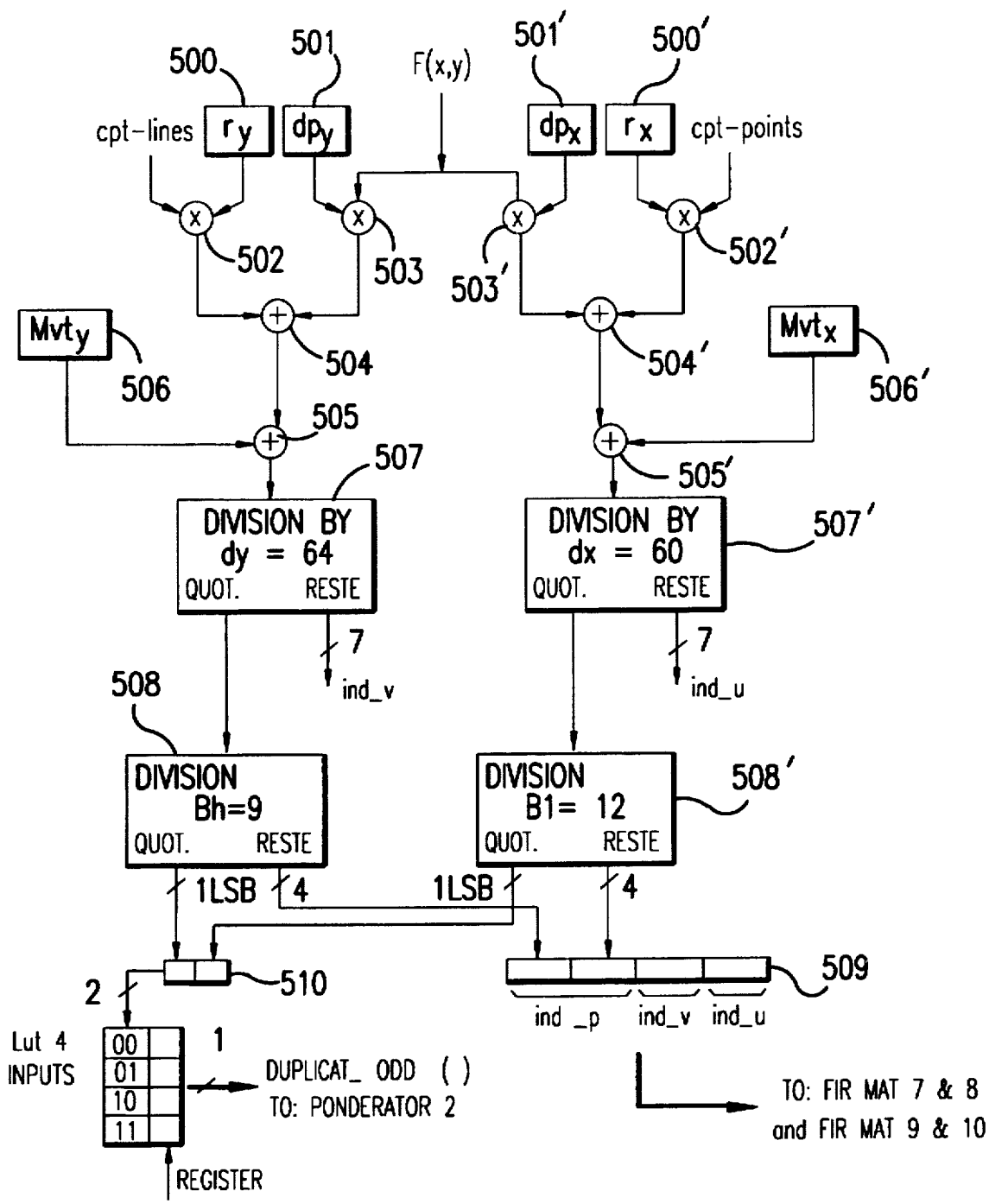
FIGS. 11 and 12 show the sequencer and ponderator circuits of FIG. 10.
Figure 12:
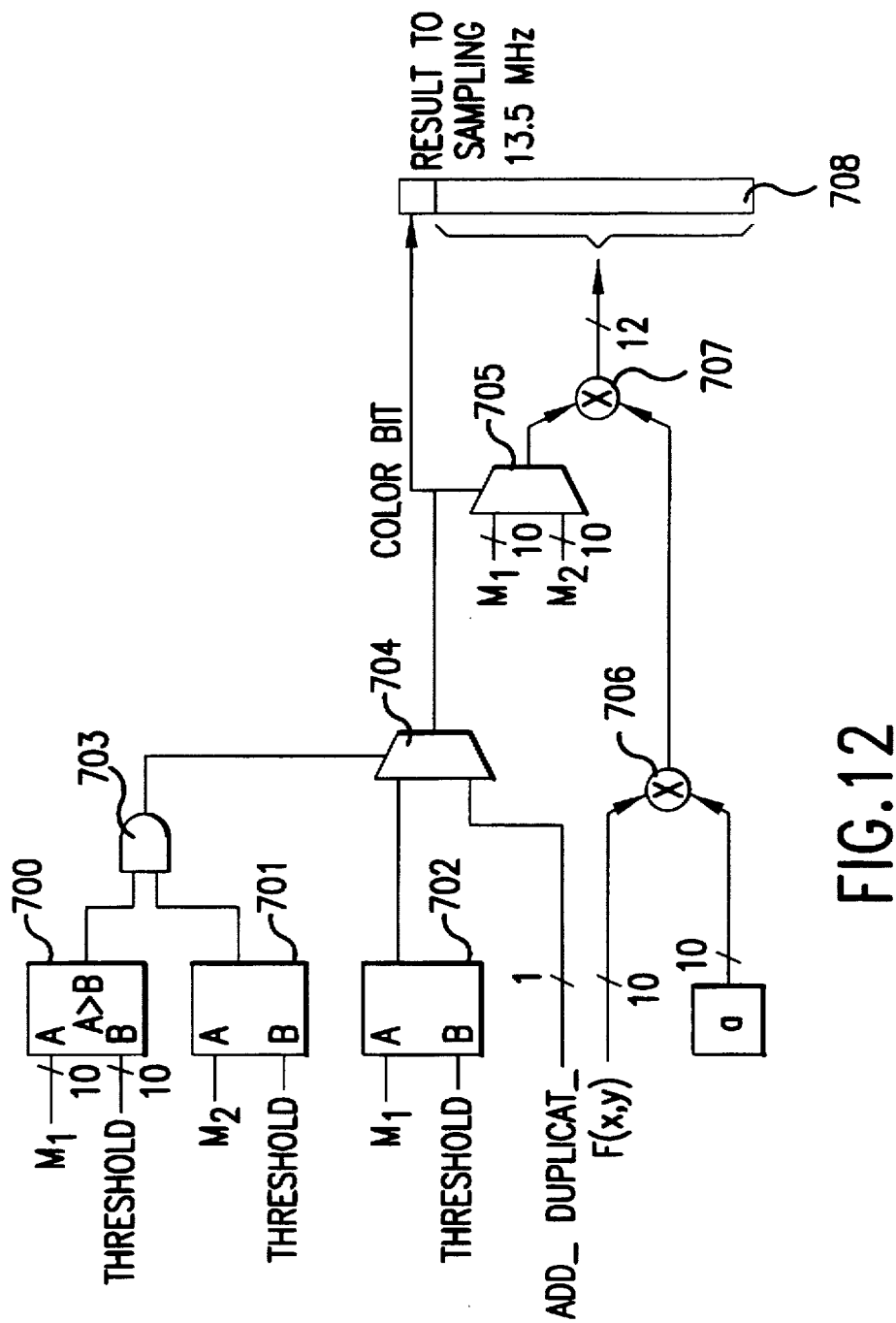

We shall now describe, with reference to FIGS. 10, 11 and 12, a device enabling the generation of the motif using the procedure described above. This device includes a "hardware" part labelled "Carte""Board"?? in FIG. 10, and a part enabling certain of data to be obtained from the processor 1, this part being labelled "Carte""Off-Board"?? in FIG. 10. The circuit part includes, as shown in FIG. 10, a sequencer 50, a calculation block 60 and a ponderator 70. The sequencer 50 receives at its input the parameters coming from the processor 1, the coordinates of a point coming from the line and point counters and the value of the fractal function F at this point from the fractal function generation circuit. The sequencer 50 generates a 22-bit address destined for the calculation block 60 that generates the functions M1 and M2 defined previously. The values of these two functions are fed simultaneously to the input of the ponderator 70 whose output is fed to a re-sampling circuit. The calculation block 60 shown in FIG. 10 is constituted by four FirMat circuits labelled FirMat 7, FirMat 8, FirMat 9, FirMat 10 arranged two by two as described with reference to FIG. 6. These four FirMat circuits enable the functions M1 and M2 to be evaluated:

$$M_1(x, y)=Spln_1(r_{xx}+dp_xF(x, y), r_yy+dp_yF(x, y))$$

$$M_2(x, y)=Spln_2(r_{xx}+dp_xF(x, y), r_yy+dp_yF(x, y))$$

We shall now describe, with particular reference to FIG. 11, a particular embodiment of the sequencer 50. The sequencer 50 in FIG. 10 must calculate the address provided to the FirMat circuits in order to evaluate the two terms $Spln_1$ and $Spln_2$. For this, it must handle the parameters $r_x$, $r_y$ for the duplication of the motifs and $dp_x$, $dp_y$ for the de-phasing of the motifs. The sequencer 50 includes registers 500 and 500' containing respectively the coefficients $r_{y\text{...}}$ and $r_x$, and registers 501 and 501' containing $dp_y$ and $dp_x$. It also includes multipliers 502, 502', 503, 503'. Multiplier 502 multiplies the value from the line counter by the value $r_y$; multiplier 502' multiplies the value from the point counter by $r_x$; multiplier 503 multiplies $dp_y$ by the fractal function $F(x,y)$; multiplier 503' multiplies $dp_x$ by the fractal function $F(x,y)$. The outputs of multipliers 502 and 503 are fed to an adder 504; the outputs of multipliers 502' and 503' are fed to an adder 504'. The output of adder 504 is fed to an adder 505 which receives on its other input a value $Mvt_y$ stored in a register 506 that constitutes a vector transaction enabling the displacement of the texture image by image. In an identical manner, the value from the adder 504' is added in an adder 505' to the value $Mvt_x$ stored in a register 506'. The value at the output of the adder 505 is fed to a divider 507 performing a division by 64; the value from the adder 505' is fed to a divider 507' performing a division by 60. The remainder of the division by 64 gives the index v; the remainder of the division by 60 gives the index u. Moreover, the quotient obtained at the output of the divider 507 is fed to a divider 508 performing a division by 9, and the quotient at the output of the divider 507' is fed to a divider 508' performing a division by 12. The remainder of the division by 9 forms a first part of the index p, whereas the remainder of the division by 12 forms the second part of the index p. The address constituted by the indices p, v, u is fed to the circuits FirMat 7 and FirMat 8, and FirMat 9 and FirMat 10. The quotient of the division by 9 and the quotient of the division by 12 are stored in a register 510 and are fed to programmed registers enabling the odd-duplicate Boolean value to be fed to the ponderator circuit 70. We use in this case a look-up table with 4 inputs programmed as a function of the type of grid; the inputs are the values 00, 01, 10, 11 and the outputs depend on the grid.

Figure 13:
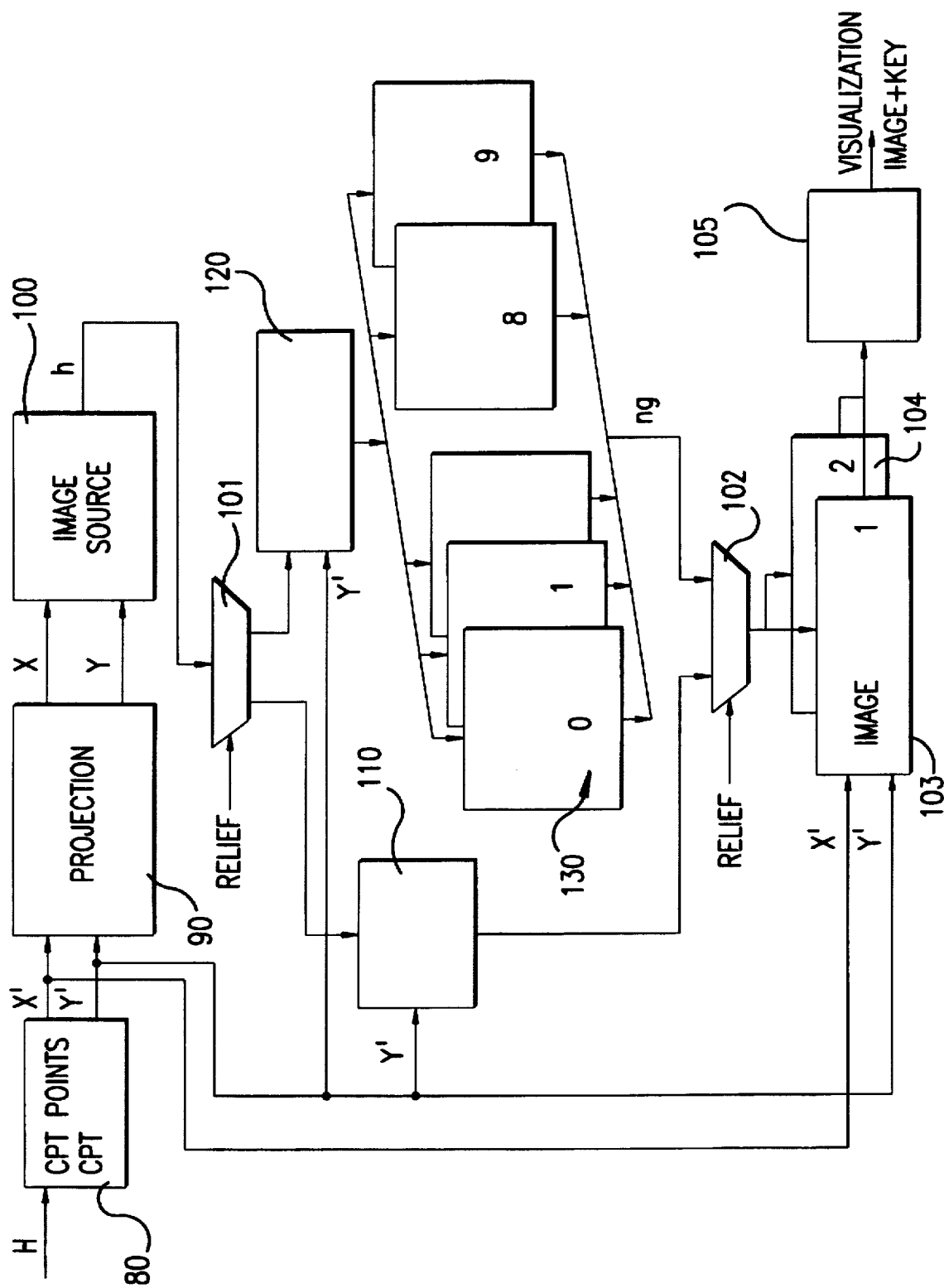
FIG. 13 is a block diagram of the re-sampling stage.

We shall now describe, with reference to FIG. 13, an embodiment of the ponderator 70. This ponderator defines the texture as a function of the user's choices for the threshold, for the motifs $P_1$ and $P_2$ described in the description of the procedure, and possibly for the method of interweaving??. As shown in FIG. 12, the ponderator 70 includes three comparators 700, 701, 702. Comparator 700 compares the value $M_1$ from the calculation block 60 with a threshold; comparator 701 compares the value $M_2$ from the calculation block 60 with a threshold; comparator 702 compares the values $M_1$ and $M_2$. More specifically, the value $M_1$ is fed to the input A of the comparator 700 and the threshold is fed to its input B; the value $M_2$ is fed to the input A of the comparator 701 and the threshold is fed to its input B; the value $M_1$ is fed to the threshold of the comparator 702 and the value $M_2$ is fed to its input B. The three comparators perform the comparison A>B. The outputs of the comparators 700 and 701 are fed to an AND circuit 703. The output of the comparator 702 is fed to an input of a multiplexer 704 which receives on its other input the Boolean odd-duplicate?? information obtained at the output of the sequencer 50 as described above. The multiplexer 704 carries out the switching at a frequency given by 703. The output of the multiplexer 704 is fed as a clock signal to a multiplexer 705 which receives the values $M_1$ and $M_2$ at its inputs. The fractal function F(x,y) is multiplied in a multiplier 706 by a coefficient a; the output of the multiplier 706 is fed to the input of an adder 707 which receives on its other input the output of the multiplexer 705. The result of the adder 707 is stored in a register 708. It will be fed to the re-sampling circuit at a frequency of 13.5 MHz. The register 708 also includes a supplementary bit used to indicate either the color of $P_1$ or the color of $P_2$.

We shall now describe, with reference to FIGS. 13 to 17, an embodiment of the re-sampling stage. As mentioned above, the re-sampling stage is intended to map the texture from the motif-generation module onto a plane in perspective. The method used is a known method referred to as "output-to-input". Moreover, we notice that in the system giving the equations (4) and (5), Y is independent of X". It is therefore possible to pre-calculate in a processor $Y_{pv}$ values for Y' ranging from 0 to $(Y_{pv}-1)$ and store them in a table $Y_1[\ ]$. Similarly, we can pre-calculate in a second table $Y_2[\ ]$, the $Y_{pv}$ possible values of $Y_{pv}/Y_{pv}-Y'$ such that the search for the source point (X,Y) of a pixel (X', Y') of the trapezoid ($C_0'$, $C_1'$, $C_2'$, $C_3'$) is equivalent to the following calculations:

$$X=Y2[Y'].(X'-X_{pv})+X_{pv}$$

$$Y=Y1[Y']$$

Depending on the parameters input by the user, the tables $Y_1[\ ]$ and $Y_2[\ ]$ and other tables $Y_3[\ ]$ and $d_3[\ ]$ utilized in the re-sampling stage are pre-calculated in the processor and loaded in the RAMs during frame suppression. Therefore, in the re-sampling stage, starting from the coordinates of the point of the final image (X', Y'), we calculate the coordinates of the point in the source image (X,Y). For this reason, the re-sampling stage shown in FIG. 13 therefore includes the point and line counters labelled 80 receiving as input a clock frequency H and giving at the output the coordinates X' and Y' of the point of the final image. These coordinates are fed to a projection circuit 90 that will be described in more detail below, which gives at its output the coordinates X,Y of the point in the source image, this source image being stored in the circuit 100. As shown in FIG. 13, the value of the pixel (x,y) of the source image can be used in two ways. It is obtained by sending the data h from the circuit 100 via a multiplexer 101 which is controlled by a "relief required"

pulse and whose two outputs are connected to a depth attenuation circuit 110 and to a circuit calculating relief parameters 120. These circuits will be described in more detail below. If we wish give a relief effect to cloud, for example, the value of the pixel becomes the thickness of the cloud at point (X,Y). The calculation of the integral is then performed by decomposing the discretization loop and by paralleling the operations. This is made possible by limiting the projected height he of h on the screen to a value of 10. Thus, as shown in FIG. 13, we use ten blocks 130 for calculation of the integral. If we do not require a relief effect, the value of the pixel (X,Y) from the source image is fed to the depth attenuation circuit 110. The output of the attenuation circuit 110 is fed to the input of the multiplexer 102, which also receives the output of the ten integral calculation blocks 130. This multiplexer 102 is controlled by the "relief required" pulse; its output is fed to two image storage circuits 103, 104 since two final images are necessary, one being calculated while the second is being displayed. The values of the points of the plane are then passed through a table 105 which stores the colors. This table 105 therefore determines the colors and the breakdown key of the final texture. In the present invention, the key is calculated by thresholding on the luminance of the pixels: if the luminance of a pixel is less than a threshold value defined by the user, the key of the pixel will be equal to 64; if it exceeds the threshold, it will be equal to 939.

Figure 14:
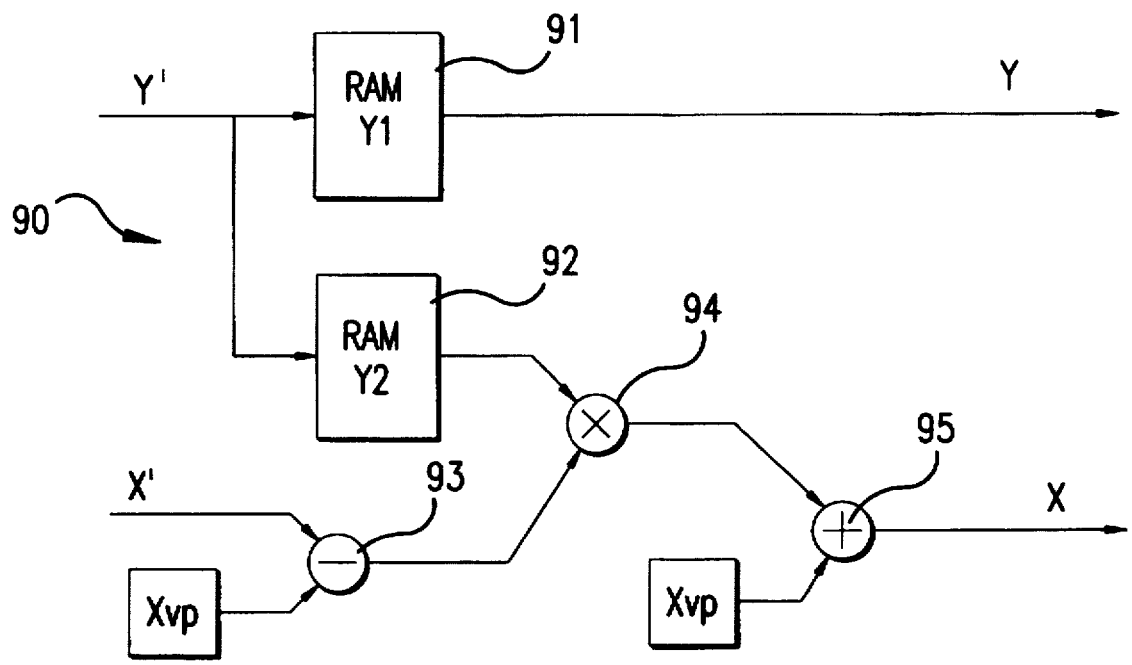
FIGS. 14 and 15 show the "projection" and "depth attenuation" circuits of FIG. 13.

We shall now describe in more detail an embodiment of the projection circuit 90. As shown in FIG. 14, the projection circuit 90 therefore includes two RAMs 91 and 92 storing respectively the tables $Y_1$ and $Y_2$ that have been pre-calculated as mentioned above. The two memories 91 and 92 receive as address the value Y' of the point. The memory 91 gives at its output the value Y of the pixel of the source image, whereas the output of the memory 92 is fed to the input of a multiplier 94 which receives on its other input the output of a subtracter 93. The subtracter 93 receives at its input the value X' of the point of the final image and the value $X_{vp}$ such as that given above during of the explanation of the re-sampling method. The output of the multiplier 94 is fed to the input of an adder 95 which adds it to the value $X_{vp}$ and which gives at its output the coordinate X of the pixel of the source image.

As mentioned above, the values Y' and X' are provided by line and point counters operating at frequency "pixel H"; for this reason, X and Y are calculated at the frequency "pixel H".

Figure 15:
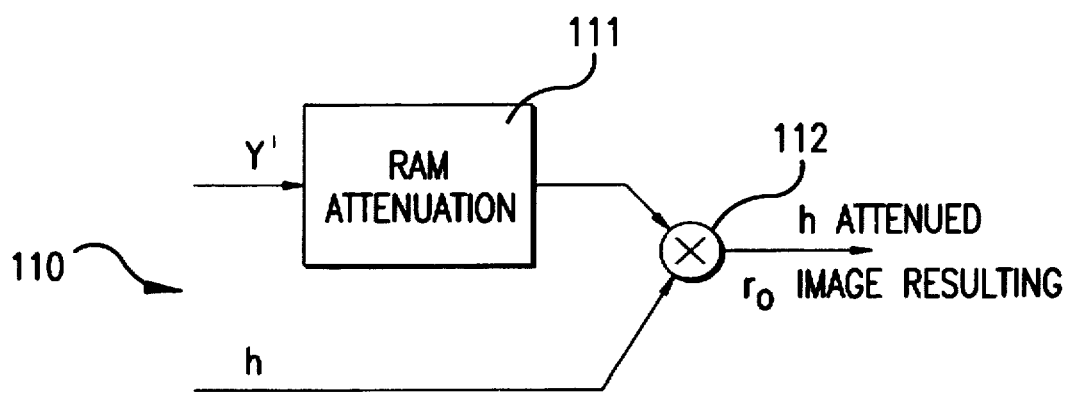

We shall now describe, with reference to FIG. 15, a possible embodiment for the depth attenuation circuit. This circuit 110 includes essentially a RAM 111 in which we store the $Y_{pv}$ possible values for the attenuation function. For each line Y', the attenuation value required is taken from the RAM 111 and it is multiplied in the multiplier 112 by the pixel values from the source image, labelled "h" in the figure. This gives attenuated pixel values labelled "h attenuated" in the figure, which are fed to the multiplexer 102, then to the final image.

Figure 16:
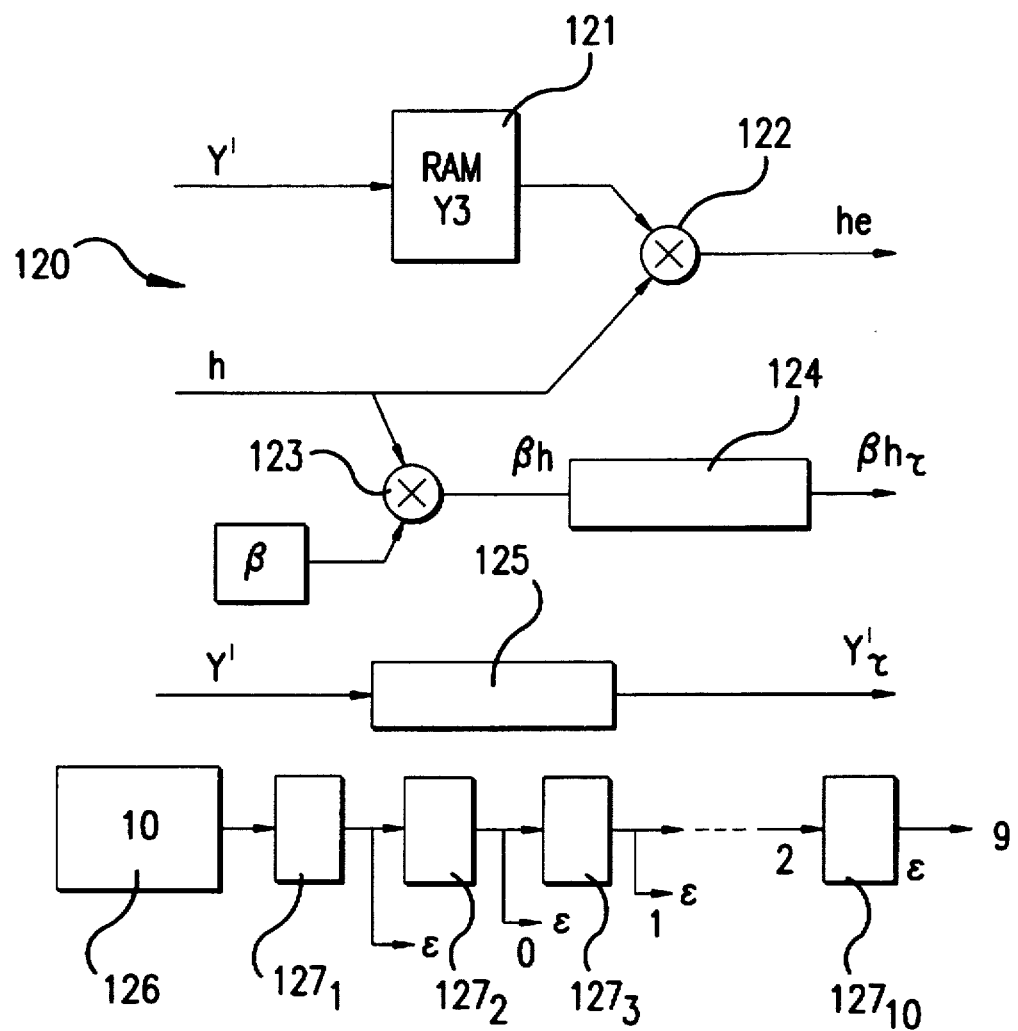
FIGS. 16 and 17 show the "relief parameters calculation" and "integral calculation block" circuits of FIG. 13.

We shall now describe, with reference to FIG. 16, a block 120 which calculates the relief parameters which enable the parallelization of the discretization operations of the integral as explained in the method above. The data he, $\beta H_\tau$ and $Y'_\tau$ are common to each block and are transmitted at the frequency "pixel H". In fact each block in parallel calculates the parameter ng for a Y" located between Y' and Y'−he. This calculation is no longer carried out directly in the final image but in buffer registers denoted Σ in FIG. 17. The 10s counter informs each block of the distance between its point Y" and the point Y'. When this distance, denoted evoie$_j$, equals he the value of the register Σ is fed to the result memory, since this register then contains the value ng at point (X', Y'). When this distance evoie$_i$ is greater than he, this means that Y" is less than Y'−he and therefore that the summing can no longer be carried out. An extreme address value is then fed to the "RAM d3" (FIG. 17) which should give a null value at the output of the "RAM expo" 136.??OK?? More specifically, the circuit 120 therefore includes a RAM 121 storing the table of the values $Y_3$ which receives as address the value Y' and gives at its output the value corresponding $Y_3$ which is fed to a multiplier 122 which receives on its other input the coordinates h of the pixel of the image and which gives at its output the attenuated value he. In addition, the value labelled h is fed to a multiplier 123 which receives on its other input a parameter β and which gives at its output the value βh which is stored in a delay line 124 which gives at its output the retarded value βh$_τ$. value βh$_τ$. Moreover, the value Y' is also fed to a delay line 125 which gives at its output the retarded value Y'$_τ$. In addition, the circuit 120 includes a 10s counter 126 whose output is connected to registers 127$_1$, 127$_2$, 127$_3$ ... 127$_{10}$ mounted in series. The output of each register gives a value evoie$_i$ (i ranging from 0 to 9). This value corresponds to the distance between the current point Y" and the current point Y', as mentioned above.

Figure 17:
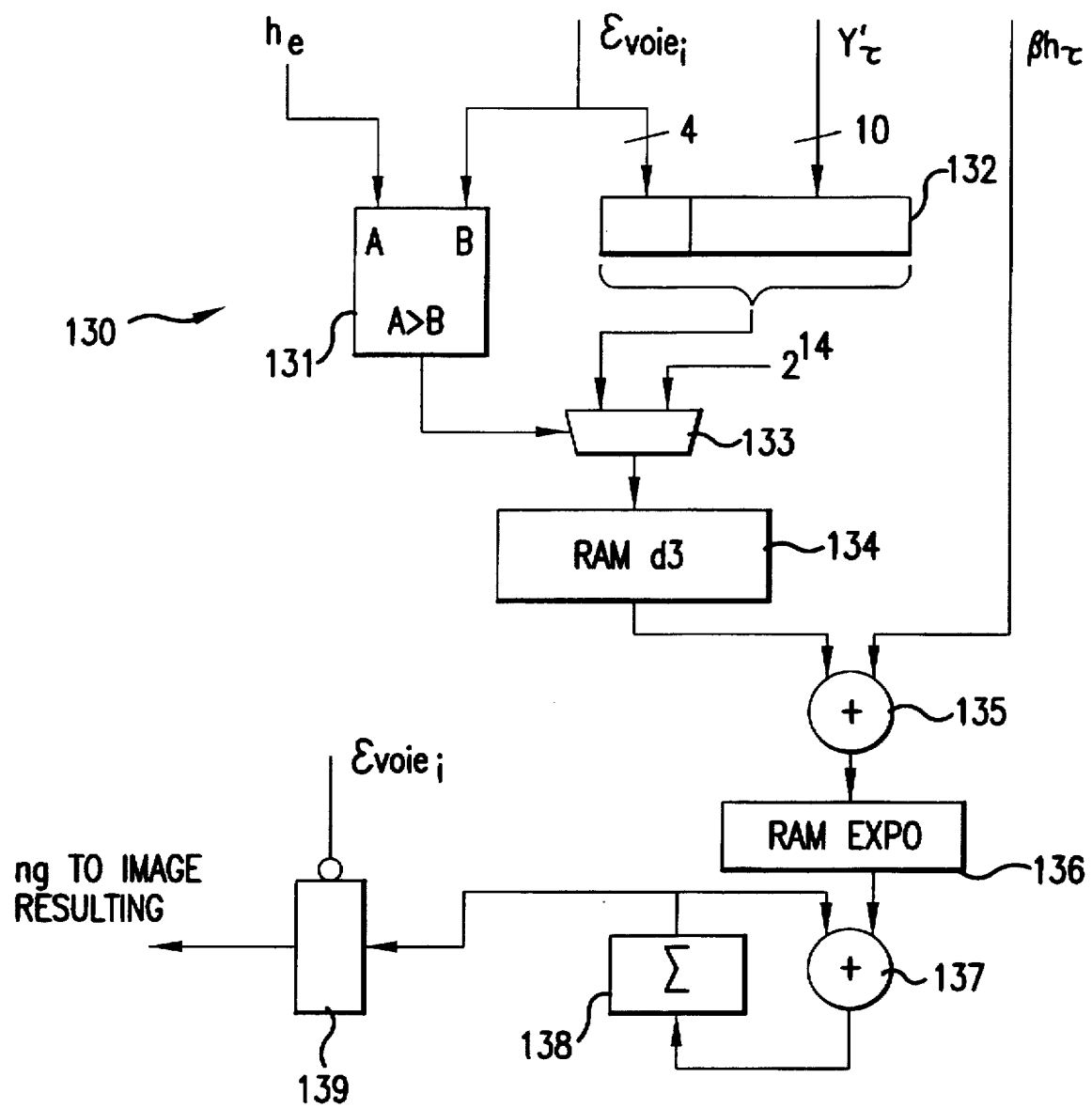

We shall now describe, with reference to FIG. 17, an embodiment of an integral calculation block, labelled 130. This circuit 130 includes a comparator 131 performing the comparison A>B and receiving on its input A the value he from the circuit calculating relief parameters 120. On its input B, it receives the value evoie$_i$ from the same circuit 120. The circuit 130 also includes a 14-bit register 132 which receives on the 4 most significant bits the value evoie$_i$ from the circuit 120 and on the 10 least significant bits the value Y'$_τ$ also from the circuit 120. The value from the register 132 and the value $2^{14}$ are fed to the input of a multiplexer 133 which is controlled by the value from the comparator 131. The value at the output of the multiplexer 133 is fed as an address to the memeory "RAM d3" 134 whose values have been pre-calculated. The output of the "RAM d3" 134 and the value βh$_τ$ from the circuit are fed to the input of an adder 135 whose output adder is fed as an address to a memory "RAM expo" 136 whose output is fed to an adder 137 which receives on its other input the output of a buffer register Σ 138 whose input is the output of the adder 137. The output of the buffer register 138 is also fed to a register 139 whose output is controlled in such a manner as to a send the value obtained to the final image when evoie$_i$ is equal to 0.

The circuits described above are examples of embodiments enabling straightforward implementation of the procedure according to the invention. It will be obvious to professionals of the art that they can be modified in many ways.

What is claimed is:

1. Procedure for generation of textured video images, including a stage for generation of a microscopic texture determined by user-defined parameters and based on a fractal interpolation function generating a fractional Brownian motion signal, wherein the fractal function is defined by:

$$F(x,y) = \sum_{K=0}^{N} r^{-kH} Spln(r^k x, r^k y)$$

where r is the lacunarity or irregularity factor (r>1);
H=(3−D), where D is the required fractal dimension;

N is a parameter fixed so as to obtain a definition to within one pixel or image element;

Spln(x,y) is the B-spline interpolation at a real point (x,y) in a grid of points generated with integer coordinates.

2. Procedure according to claim 1, wherein the user-defined parameters are random or deterministic.

3. Procedure according to claim 1, wherein to generate images of size L×W, L being the number of active lines in the screen and W the number of points per line, the image is divided into Nbc=Bl×Bh blocks of size dl×dh pixels, where integers Bl and Bh indicate respectively the horizontal and vertical positions of the blocks, the domain of definition of said function Spln( ) then being the set [0, Bl]×[0, Bh].

4. Procedure according to claim 3, wherein the images have a size of 720×576 pixels up to 1920×1250 pixels.

5. Procedure according to claim 3, wherein said function Spln( ) is a cubic B-spline function.

6. Procedure according to claim 5, wherein the calculation of said function Spln( ) at a point $P_{xy}$ is defined by:

$$Spln(P_{xy}) = X^T M_B^T \begin{bmatrix} P00 & P10 & P20 & P30 \\ P01 & P11 & P21 & P31 \\ P02 & P12 & P22 & P23 \\ P03 & P13 & P23 & P33 \end{bmatrix} M_B Y$$

where $$X = \begin{bmatrix} 1 \\ x^1 \\ x^2 \\ x^3 \end{bmatrix} \text{ and } Y = \begin{bmatrix} 1 \\ y^1 \\ y^2 \\ y^3 \end{bmatrix}$$

and $M_B$ is the matrix enabling the calculation of the coefficients of the bi-cubic polynomial.

7. Procedure according to claim 1, wherein said function Spln(r$^k$x, r$^k$y) is calculated by mapping the values of the couple (r$^k$x, r$^k$y) into the set [0, Bl]×[0, Bh].

8. Procedure according to claim 1, wherein:

$$N = \frac{\log dl}{\log r}, \text{ with } dl = Bl/W$$

9. Procedure according to claim 8, wherein N=5.

10. Device for implementation of the process according claim 1, which includes a specific circuit for calculation of said function Spln( ).

11. Device according to claim 10, wherein the circuit for calculation of the function Spln( ) enables, first, the following matricial calculation to be performed:

$$\begin{bmatrix} P00 & P01 & P02 & P03 \\ P10 & P11 & P12 & P13 \end{bmatrix} \times \begin{bmatrix} x_0 \\ x_1 \\ x_2 \\ x_3 \end{bmatrix} = \begin{bmatrix} R_0 \\ R_1 \end{bmatrix}$$

followed by a second calculation which is the multiplication of:

$$\begin{bmatrix} R_0 \\ R_1 \end{bmatrix} \text{ by } [y_0 \ y_1]$$

12. Procedure for generation of textured video images, including a stage for generation of a microscopic texture determined by user-defined parameters and based on a fractal interpolation function generating a fractional Brownian motion signal also including a motif-generation stage receiving as input the image of said fractal function and said user-defined parameters and giving at its output a macroscopic texture wherein two primitives are used, each characterized by Npt points interpolated by a B-spline function.

13. Procedure according to claim 12, wherein the following functions are used:

$$M_1(x, y) = Spln_1(r_x x + dp_x F(x,y), r_y y + dp_y F(x,y))$$

$$M_2(x, y) = Spln_2(r_x x + dp_x F(x,y), r_y y + dp_y F(x,y))$$

where $r_x$ and $r_y$ are duplication coefficients of the motifs in x and y respectively;

$dp_x$ and $dp_y$ are coefficients of dephasing of the motifs in x and y respectively;

$F(x,y)$ is the value of the fractal function at point $(x,y)$;

$M_1(x,y)$ is the value at point $(x,y)$ of the motif $P_1$ duplicated $r_x$ times in x, $r_y$ times in y and dephased by $dp_x F(x,y)$ in x and by $dp_y F(x,y)$ in y;

$M_2(x,y)$ is the value at point $(x,y)$ of the motif $P_2$ duplicated $r_x$ times in x, $r_y$ times in y and dephased by $dp_x F(x,y)$ in x and $dp_y F(x,y)$ in y.

14. Procedure for generation of textured video images, including a stage for generation of a microscopic texture determined by user-defined parameters and based on a fractal interpolation function generating a fractional Brownian motion signal further including a re-sampling stage enabling a mapping of the textured image onto a surface, and wherein the re-sampling is carried out using an "output-to-input" method.

15. Procedure according to claim 14, wherein a depth effect is added to the image by attenuating the luminosity of points of the surface as a function of their distance from the display point.

* * * * *

UNITED STATES PATENT AND TRADEMARK OFFICE
CERTIFICATE OF CORRECTION

PATENT NO. : 5,796,407
DATED      : August 18, 1998
INVENTOR(S): Mohammed REBIAI It is certified that error appears in the above-identified patent and that said Letters Patent is hereby corrected as shown below:

On the title page, item [54], and on top of column 1, please change the word TEXTURE for:

--.........TEXTURED ........--

Signed and Sealed this

Thirtieth Day of March, 1999

Attest:

Q. TODD DICKINSON

Attesting Officer

Acting Commissioner of Patents and Trademarks